United States Patent [19]

Murakami et al.

[11] Patent Number: 5,523,525
[45] Date of Patent: Jun. 4, 1996

[54] PERFORMANCE RECORDING AND PLAYBACK APPARATUS

[75] Inventors: Kazuo Murakami; Akira Hashimoto, both of Hamamatsu, Japan

[73] Assignee: Yamaha Corporation, Japan

[21] Appl. No.: 106,079

[22] Filed: Aug. 13, 1993

[30] Foreign Application Priority Data

| Aug. 17, 1992 | [JP] | Japan | 4-218018 |
| Aug. 28, 1992 | [JP] | Japan | 4-60815 U |
| Oct. 13, 1992 | [JP] | Japan | 4-274663 |
| Feb. 12, 1993 | [JP] | Japan | 5-024531 |

[51] Int. Cl.$^6$ ............... G09B 15/04; H04B 7/00; H04B 7/08
[52] U.S. Cl. ............... 84/602; 84/645; 348/460; 348/462; 348/481
[58] Field of Search ............... 84/600–602, 604, 84/609, 615, 641, 642, 645, 1, 3, 105, 115; 348/460–462, 465, 484, 485

[56] References Cited

U.S. PATENT DOCUMENTS

| 4,419,920 | 12/1983 | Ohe | 84/11.5 |
| 5,247,126 | 9/1993 | Okamura et al. | 84/609 |
| 5,286,907 | 2/1994 | Okamura et al. | 84/601 |
| 5,321,200 | 6/1994 | Yamamoto | 84/645 |
| 5,335,073 | 8/1994 | Yamamoto | 84/601 |
| 5,336,844 | 8/1994 | Yamauchi et al. | 84/602 |
| 5,393,976 | 2/1995 | Johnson | 84/616 |

*Primary Examiner*—Vit W. Miska
*Attorney, Agent, or Firm*—Graham & James

[57] ABSTRACT

A performance recording and playback apparatus is provided between a performance apparatus and a video apparatus in an audio/video recording and playback system. The performance apparatus is capable of producing and reproducing performance data, while the video apparatus is capable of recording and playing back performance data and video data on a single recording medium. Herein, the performance data produced from the performance apparatus is supplied to and recorded by the video apparatus. Under the operation of the performance recording and playback apparatus, a recording operation of the video apparatus is controlled such that the performance data is recorded in synchronism with the video data, while playback operations of the video apparatus and performance apparatus are also controlled such that the performance data which is played back from the recording medium and then supplied to the performance apparatus is reproduced in synchronism with the video data which is played back from the recording medium and is displayed on a display device. Preferably, the performance apparatus is an automatic player piano or an electronic musical instrument, while the video apparatus is a video tape recorder so that the recording medium is a video tape.

21 Claims, 15 Drawing Sheets

(FIRST EMBODIMENT)

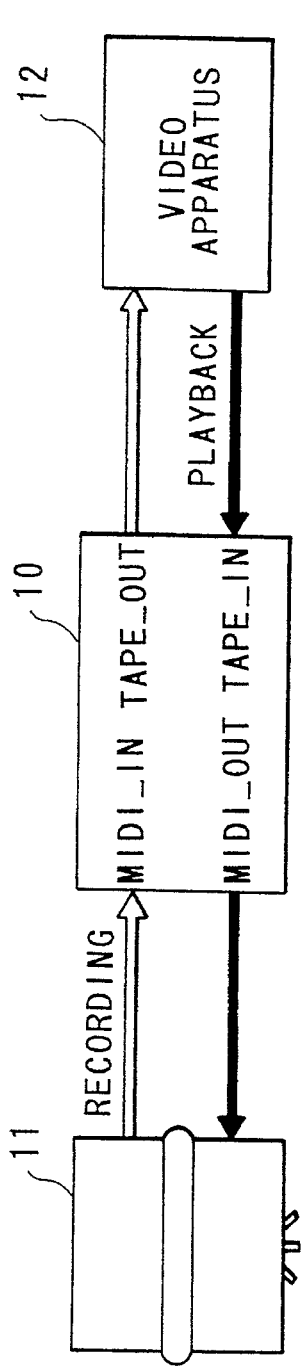
FIG.1 (FIRST EMBODIMENT)
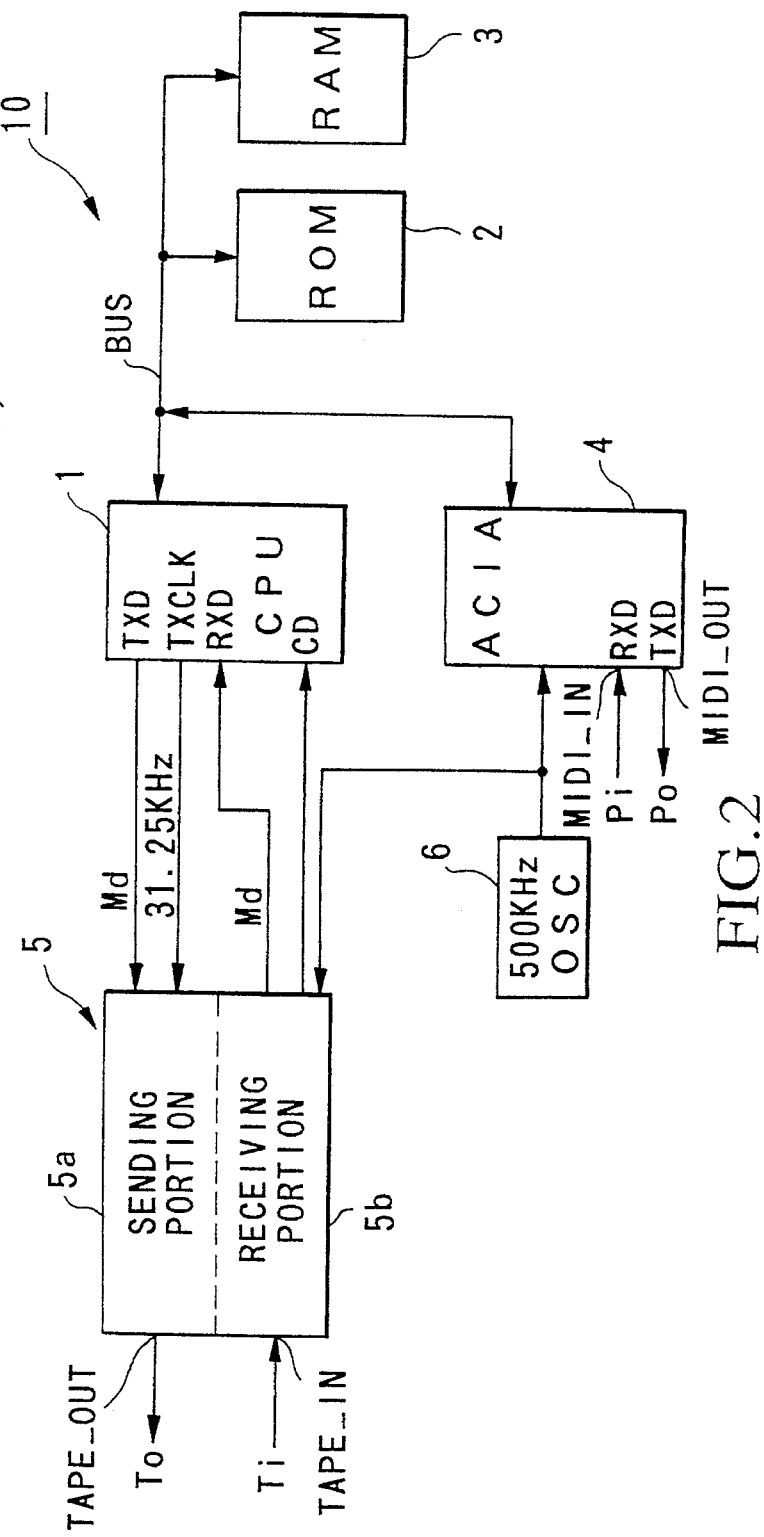
FIG.2

PERFORMANCE RECORDING AND PLAYBACK APPARATUS

BACKGROUND OF THE INVENTION

The present invention relates to a performance recording and playback apparatus which records and plays back performance information.

According to a recent technology which is developed in the field of the audio/video recording and playback system, performance data which are produced responsive to a musical performance are recorded in a recording medium, while video data representing scenes which are suitable for the musical performance to be played are also recorded in a recording medium, so that both of the performance data and video data are played back in a synchronized manner. According to this technology, when playing back the performance data in synchronism with the video data, the video data which is recorded by a video apparatus is reproduced and displayed on a display device, while the performance data is played back in response to a synchronizing signal which is produced from an output signal of the video apparatus, for example.

In the above-mentioned synchronized playback operation, a synchronizer produces the synchronizing signal on the basis of the output signal of the video apparatus, and then, the synchronizing signal is supplied to a sequencer. Then, the sequencer sequentially reads out the performance data, which are stored in a floppy disk and the like in advance, by a performance tempo which corresponds to the synchronizing signal. The performance data which are read by the sequencer are supplied to an automatic performance apparatus. Thus, the automatic performance apparatus reproduces the performance data in synchronism with the video data.

In the synchronizer which is used for the synchronized playback operation described above, a pulse signal designating a tempo of the rhythm is stored in a storage medium in connection with a measure number (i.e., a serial number which is assigned to each of the measures written on a score) and a beat number (i.e., a serial number which is assigned to each of the beats written on a score), whereas the pulse signal (i.e., synchronizing signal) which designates the measure number and the beat number is reproduced when the performance data is played back. This technique enables it possible to play back a tune from an arbitrary part. This type of synchronizer is disclosed in Japanese Patent Publication No.1-15877 or Japanese Utility-Model Laid-Open Publication No.60-19096, for example.

In the above-mentioned technology, the video data and the performance data are stored independently such that the video data are recorded on a video tape, while the performance data are stored in a floppy disk. Therefore, if an amount of the data to be stored is increased, it becomes difficult to perform a data management.

In addition, since the different media are required for the video data and the performance data, a configuration of the system as a whole becomes complicated. This causes a trouble for the users when operating the system.

Further, when stopping a playback operation for the recording medium or when fast feeding or rewinding the recording medium, a correspondence between the video data and performance data may not be sometimes maintained. In such case, a search time may be required in order to re-establish a correspondence between the video data and performance data.

SUMMARY OF THE INVENTION

It is accordingly a primary object of the present invention to provide a performance recording and playback apparatus by which the performance data can be recorded and played back in synchronism with the video data to be displayed.

According to a fundamental configuration of the present invention, a performance recording and playback apparatus is provided between a performance apparatus and a video apparatus in an audio/video recording and playback system. The performance apparatus is capable of producing and reproducing performance data, while the video apparatus is capable of recording and playing back performance data and video data on a single recording medium. Herein, the performance data produced from the performance apparatus is supplied to and recorded by the video apparatus.

Under the operation of the performance recording and playback apparatus, a recording operation of the video apparatus is controlled such that the performance data is recorded in synchronism with the video data, while playback operations of the video apparatus and performance apparatus are also controlled such that the performance data which is played back from the recording medium and then supplied to the performance apparatus is reproduced in synchronism with the video data which is played back from the recording medium and is displayed on a display device. Incidentally, the performance apparatus is an automatic piano or an electronic musical instrument, while the video apparatus is a video tape recorder so that the recording medium is a video tape.

BRIEF DESCRIPTION OF THE DRAWINGS

Further objects and advantages of the present invention will be apparent from the following description, reference being had to the accompanying drawings wherein the preferred embodiments of the present invention are clearly shown.

In the drawings:

FIG. 1 is a block diagram showing a whole configuration of the audio/video recording and playback system accompanied with a first embodiment of the present invention;

FIG. 2 is a block diagram showing an electronic configuration of a performance recording and playback apparatus according to the first embodiment of the present invention;

DESCRIPTION OF THE PREFERRED EMBODIMENTS

[A] First Embodiment

Figure 3:
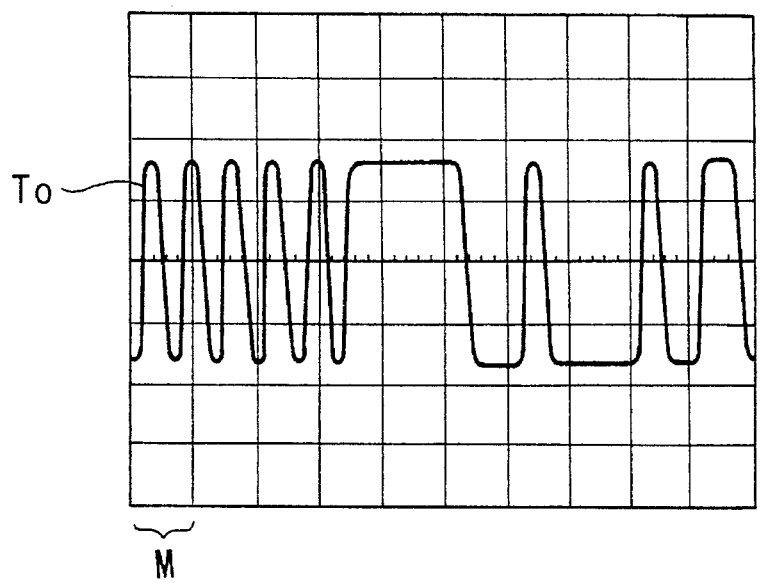
FIG. 3 is a graph showing an example of a waveform of an analog modulation signal (i.e., MIDI signal) which is monitored by an oscilloscope.

FIG. 1 is a block diagram showing a whole configuration of the audio/video recording and playback system. Herein, a numeral 10 designates a performance recording and playback apparatus according to a first embodiment of the present invention. This apparatus 10 is connected with a MIDI apparatus 11 and a video apparatus 12 (e.g., video deck). As the MIDI apparatus 11 (i.e., an apparatus which deals with a signal based on a standard for Musical Instrument Digital Interfaces), an automatic piano (i.e., an automatic player piano) is employed. The video apparatus 12 records the video information representing the performance scenes and the like. When recording the musical performance data, the apparatus 10 receives and inputs the musical performance data in a form of digital signals (i.e., MIDI data) which are sequentially outputted from the automatic piano 11 when playing the automatic piano 11, and then, such MIDI data are converted into analog modulated musical performance signals (hereinafter, simply referred to as analog signals, i.e., MIDI signals). These analog signals are delivered to the video apparatus 12. Thus, the video apparatus 12 can write the MIDI data, supplied from the apparatus 10, into an audio track (i.e., left or right channel which is formed on a video tape) in parallel with a recording operation of video data representing the performance scenes corresponding to images in which a player plays the automatic piano 11.

On the other hand, when playing back the performance data, the video apparatus 12 reads out the MIDI data, which are written on the audio track of the video taper in parallel with a playback operation of the video data which are recorded on the video tape. The apparatus inputs the MIDI signals outputted from the video apparatus 12, and then, such analog MIDI signals are converted into the digital MIDI data, which are supplied to the automatic piano 11. Thus, the automatic piano 11 can automatically plays back the musical performance corresponding to the MIDI data supplied from the apparatus 10 in synchronism with the video image which is displayed by the video apparatus 12.

FIG. 2 is a block diagram showing an electronic configuration of the apparatus 10. In FIG. 2, a numeral 1 designates a central processing unit (i.e., CPU) which controls several portions of the circuitry linked together by a bus BUS. The CPU performs several kinds of processings, such as a control process for input/output operations of serial data containing the MIDI data, a process for a carrier detection, a process for detecting a signal breaking event and an error process which is required when a communication error is occurred. These processes will be described later. A read-only memory (i.e., ROM) 2 stores several kinds of control programs which are loaded by the CPU 1. A random-access memory (i.e., RAM) 3 is used as a work area for the CPU 1. Values set in several kinds of registers are temporarily stored in the RAM 3.

A numeral 4 designates an asynchronous communication interface adapter (i.e., ACIA, which is embodied by an asynchronous communication LSI) which controls input/output operations with respect to the automatic piano 11. When recording the musical performance, the MIDI signal (designated by a symbol "Pi") outputted from the automatic piano 11 is inputted into an input terminal called "MIDI_IN" of the ACIA 4, from which the corresponding MIDI data are outputted to the CPU 1.

On the other hand, when playing back the musical performance, the MIDI data outputted from the CPU 1 is supplied to the ACIA 4, in which the corresponding MIDI signal (designated by a symbol "Po") is outputted from an output terminal called "MIDI_OUT". This MIDI signal is supplied to the automatic piano 11. In this case, the MIDI signals Pi, Po are transmitted between the automatic piano 11 and the ACIA 4 in synchronism with a MIDI transfer rate corresponding to a frequency 31.25 kHz. More specifically, a part of the MIDI signal which corresponds to one bit of the MIDI data is transmitted in correspondence with a half wavelength of a carrier wave having a carrier frequency 15.625 kHz.

A numeral 5 designates a transmission portion which controls a data communication with respect to the video apparatus 12. This transmission portion 5 is configured by a sending portion 5a and a receiving portion 5b. When recording the musical performance, the sending portion 5a receives MIDI data Md from the CPU 1 so as to convert it into an analog signal, which is outputted to the video apparatus 12 from an output terminal called "TAPE_OUT" as a MIDI signal To.

FIG. 3 shows an example of a waveform which can be observed by watching a oscilloscope monitoring the MIDI signal To when the MIDI data is converted into the MIDI signal. In FIG. 3, one divided scale "M" in a horizontal axis of a graph shown in FIG. 3 represents a time of 100μ sec. It can be observed from this graph that one divided scale M is roughly set corresponding to one period and a half of the waveform representing the carrier wave. In other words, a half period of the carrier wave is approximately equal to 32μ sec. Therefore, a half period of the carrier wave will correspond to the aforementioned MIDI transfer rate, i.e., 31.25 kHz.

On the other hand, the receiving portion 5b inputs a MIDI signal Ti supplied from the video apparatus 12 at an input terminal called "TAPE_IN". This MIDI signal Ti is converted into the MIDI data Md, which is outputted to the CPU 1. When receiving the carrier wave, the receiving portion 5b outputs a carrier detection signal (i.e., CD signal) to the CPU 1. Thus, the CPU 1 is informed of a receipt of the carrier wave by receiving the CD signal.

Figure 4:
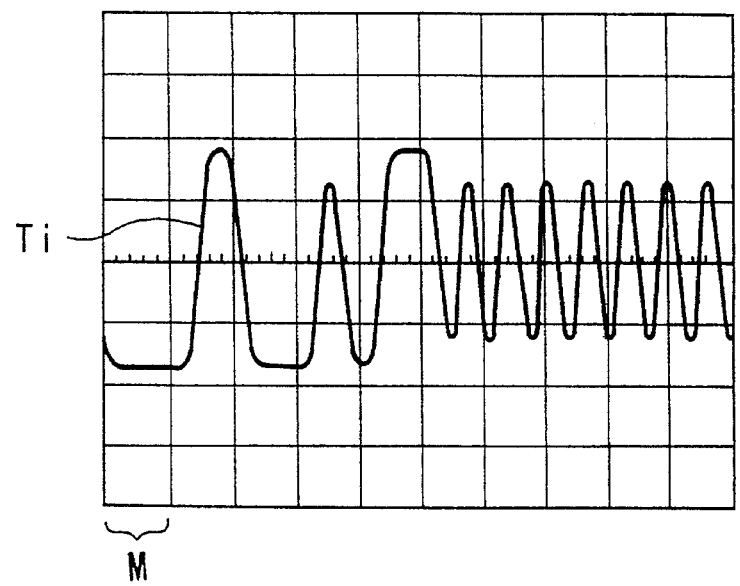
FIG. 4 is a graph showing another example of the waveform of the analog modulation signal which is monitored by an oscilloscope.

FIG. 4 shows an example of a waveform which is observed from the oscilloscope monitoring the analog MIDI signal which is reproduced from the video tape. In the graph shown in FIG. 4, one period and a half of the waveform representing the carrier wave is roughly identical to one divided scale, i.e., 100μ sec, in the horizontal axis. This fact indicates that a half period of the carrier wave corresponds to the MIDI transfer rate of 31.25 kHz.

Now, the configuration of the apparatus 10 is described again by referring to FIG. 2. In FIG. 2, a numeral 6 designates an oscillator. This oscillator 6 delivers an oscillation signal at a frequency 500 kHz to both of the ACIA 4 and the transmission portion 5. Thus, both of the ACIA 4 and the transmission portion 5 can act upon the oscillation signal supplied thereto.

Figure 5:
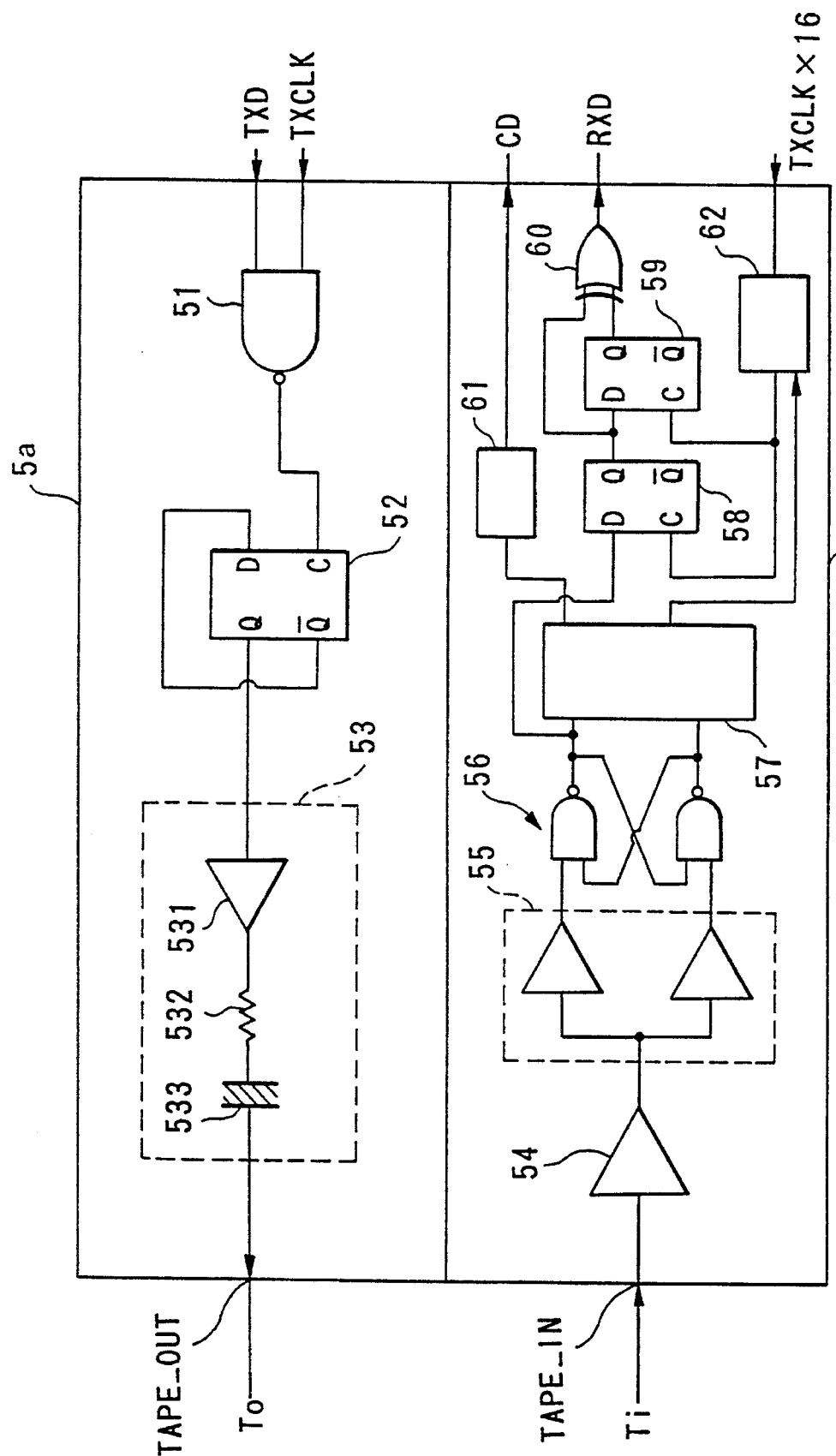
FIG. 5 is a block diagram showing a detailed configuration of a transmission portion shown in FIG. 2.

Next, an electronic configuration of the transmission portion 5 will be described in detail by referring to a block diagram shown in FIG. 5. The sending portion 5a is mainly configured by a NAND circuit 51, a D-type flip-flop 52 and a modulation circuit 53. The modulation circuit 53 consists of a differential amplifier 531, a resistor 532 and a capacitor 533 which are connected in series. Thus, the sending portion 5a inputs the MIDI data outputted from an output terminal TXD of the CPU 1 in synchronism with a clock signal at a frequency 31.25 kHz which is outputted from another output terminal TXCLK of the CPU 1; and then, the sending portion 5a modulates and converts the MIDI data into the analog signal which will be outputted from the output terminal TAPE_OUT.

On the other hand, the receiving portion 5b is mainly configured by an amplifier 54, a comparator 55, a R-S flip-flop 56, a one-shot multivibrator (shortened as "SMV") 57, two D-type flip-flops 58, 59 and an Exclusive-OR circuit (called "XOR" circuit) 60 which are connected together in series. The SMV 57 is connected with a CD circuit 61 which supplies the CD signal to an input terminal CD of the CPU 1, wherein the CD signal is produced to indicate a start timing for sending the carrier wave. Further, the D-type flip-flops 58, 59 are connected with a count circuit 62 which counts a number of pulses included in the oscillation signal at 500 kHz given from the oscillator 6. Incidentally, the count circuit 62 detects a pulse which is supplied as an eighth pulse in the oscillation signal, because such pulse may be the most stable pulse.

Figure 6:
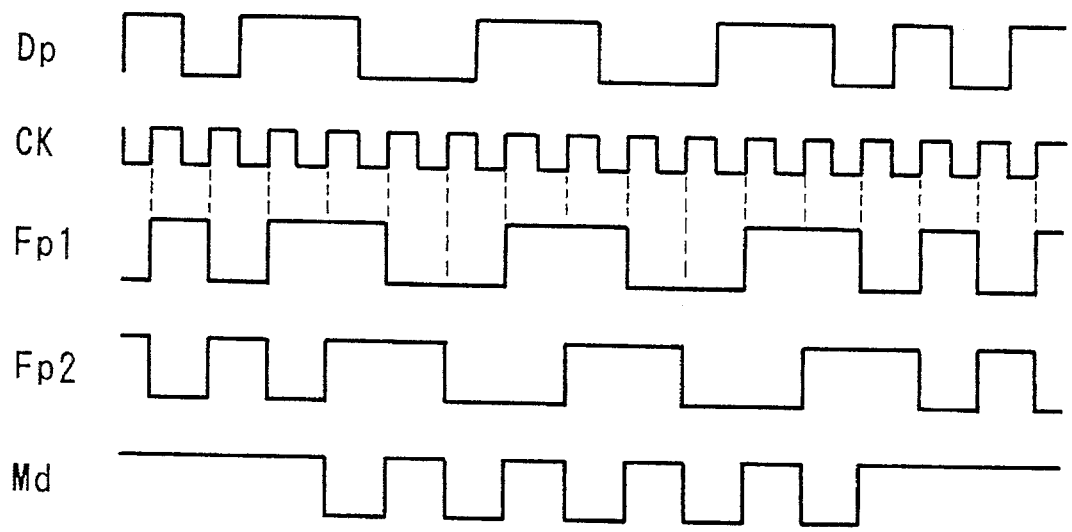
FIG. 6 shows waveforms of pulse signals which are used in connection with a receiving portion shown in FIG. 5.

The receiving portion 5b receives the analog MIDI signal Ti outputted from the video apparatus 12 at the input terminal TAPE_IN; this analog MIDI signal is amplified by the amplifier 54; and then, the comparator 55 converts an amplified signal into a digital-pulse signal Dp shown in FIG. 6. This digital-pulse signal Dp is supplied to the SMV 57 by means of the R-S flip-flop 56, wherein a trailing edge of each pulse is detected. When a predetermined number of the periods of the carrier wave (e.g., twelve periods) are detected after detecting a first trailing edge of the digital pulse Dp, the CD circuit 61 outputs the CD signal to the input terminal CD of the CPU 1.

The digital pulse Dp of which trailing edge is detected by the SMV 57 is supplied to an input D of the D-type flip-flop 58. Thus, the D-type flip-flop 58 produces an output pulse Fp1 on the basis of a clock CK given from a frequency divider 62 as shown in FIG. 6. On the other hand, another D-type flip-flop 59 produces another output pulse Fp2 (see FIG. 6) on the basis of the clock CK. As compared to the output pulse Fp1, the output pulse Fp2 appears at an output of the D-type flip-flop 59 at the one clock pulse later. Thereafter, the XOR circuit 60 performs a logical function of "Exclusive OR" on the output pulses Fp1 and Fp2; and then, a result is supplied to an input terminal RXD of the CPU 1 as the MIDI data Md (see FIG. 6).

Figure 7:
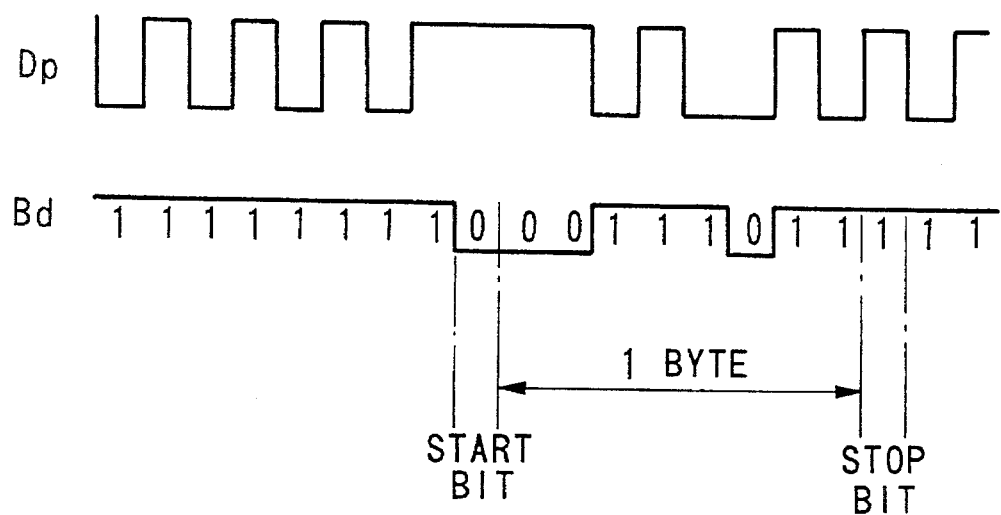
FIG. 7 shows waveforms of other pulse signals which is used for explaining a coding operation of the receiving portion.

Therefore, when the analog signals outputted from the video apparatus 12 are sequentially converted into the digital pulses Dp as shown in FIG. 7, a pulse train Dp is coded into a bit train Bd. The receiving portion 5b produces a digit 1 when a current pulse level is changed as compared to a previous pulse level, while the receiving portion 5b produces a digit 0 when the current pulse level is not changed as compared to the previous pulse level.

Under the operation of the apparatus 10, when recording the musical performance played by use of the automatic piano 11, the MIDI data (i.e., performance data) which are sequentially outputted from the automatic piano 11 are transferred to the video apparatus 12 which is recording the performance scenes of the automatic piano 11, wherein the MIDI data are written on one-side audio track formed on the video tape. In order to match the writing operation of the MIDI data with the aforementioned MIDI transfer rate (i.e., 31.25 kHz), each bit of the MIDI data is transferred to the video apparatus 12 in correspondence with a half wavelength of the carrier wave having a frequency 15.625 kHz. Thus, the MIDI data can be recorded in synchronism with the video data without causing any delays between these two data.

Meanwhile, when playing back the performance data which are recorded on the video tape as described above, the MIDI data is read out while simultaneously reproducing the video data. The MIDI data read from the video tape is transferred to the automatic piano 11. In this case, a transfer of the MIDI data is performed in correspondence with the predetermined transfer rate, so that the automatic piano 11 can play back the musical performance in synchronism with the video image which is reproduced by the video apparatus 12.

According to the present embodiment described above, all of the video data, performance data and the other data representing the other audio sounds are recorded on the same recording medium (i.e., video tape). Such recording technique can make the data management easier or can simplify the configuration of the system. Hence, it is possible to provide the system which can be easily operated by the users.

Figure 8:
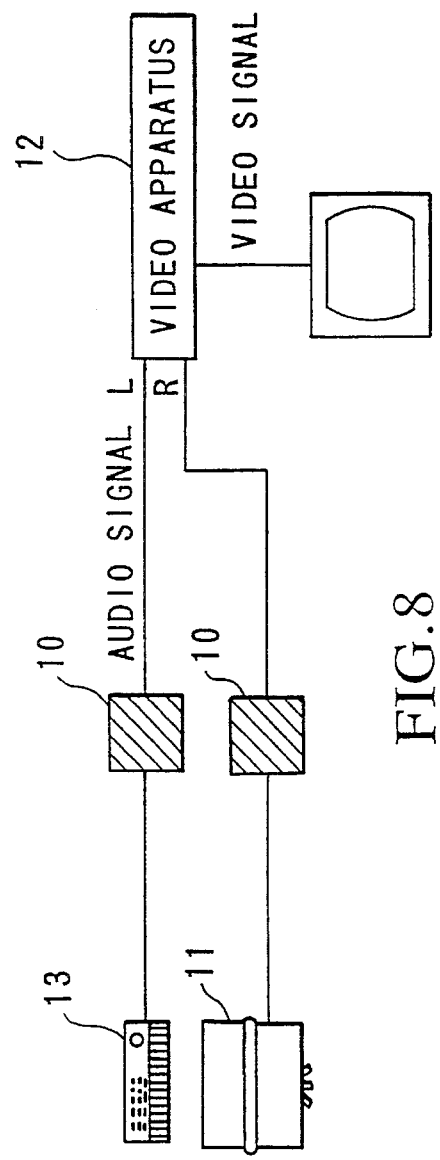
FIG. 8 is a block diagram showing a modified example of the system shown in FIG. 1.

In addition, the present embodiment is designed to record the MIDI data on the audio track which is provided at one side of the audio channels formed on the video tape. However, it is possible to modify the present embodiment such that both of the audio channels (i.e., right and left channels) can be used for recording the audio data as shown in FIG. 8. In FIG. 8, the automatic piano 11 is connected to be accessible to the right channel of the video apparatus 12 by means of the apparatus 10, while an electronic musical instrument 13 is newly provided to be accessible to the left channel of the video apparatus 12 by means of the apparatus 10.

According to the system shown in FIG. 8, the performance data outputted from the automatic piano 11 is recorded on a right-side audio track of the video tape, while another performance data produced by the electronic musical instrument 13 is recorded on a left-side audio track of the video tape. Thus, when playing back the video tape, the musical performance played by two kinds of musical instruments can be sounded in a synchronized manner. In the case of the known hi-fi VTR system, both of the right and left audio tracks are used for recording the MIDI data, so that the audio sounds may not be recorded well. However, in the case of the advanced VTR system which provides a PCM sound recording function, there are provided two kinds of recording areas, in which one area is provided for a hi-fi recording, while another one is provided for a digital recording. Thus, this system can perform a stereo recording on the audio sounds.

Moreover, the present embodiment can be widely used for any other fields. For example, this system can be used as a so-called lesson tool which is suitable for giving lessons in musical performance. Conventionally, it is difficult to teach the fingering technique or cross-hand technique by merely moving the keys on the keyboard of the automatic piano. However, according to the present system, the performing techniques played by a performer can be displayed visually, so that a person can easily understand the performing techniques from the displayed images. Thus, the present system can remarkably improve the effect of the lessons.

In addition, the present system can be used for a so-called home video concert. In this case, the audience can watch the performance scenes and/or can read a commentary by use of the display device while listening to the musical performance. Or, a piano concerto can be performed easily. In short, it is possible to enjoy the music more and more.

Further, the present system can be used for a so-called mini concert. In this case, it is possible to appreciate a famous music even in a small or medium-size concert hall. Or, it is possible to enjoy listening to the live performance of piano while watching the performing scenes in which the performer play the musical instrument.

Furthermore, the present system can be used for a so-called contest tool. Before the contest, the performer can record the piano performance played by himself by use of the automatic piano. On the date of contest, when performing a so-called four-hand playing on the piano by one performer, the performer can match his piano play with the reproduced piano play by watching the displayed performing scenes of the automatic piano corresponding to the reproduced piano play.

Incidentally, the present system can be easily applied to the wired broadcast system. In this case, the performance data can be transmitted in a real-time manner. Since the wired broadcast system uses a so-called direct network system (i.e., private line) other than the common telephone line, it is possible to transmit the performance data by a higher frequency.

[B] Second Embodiment

Figure 9:
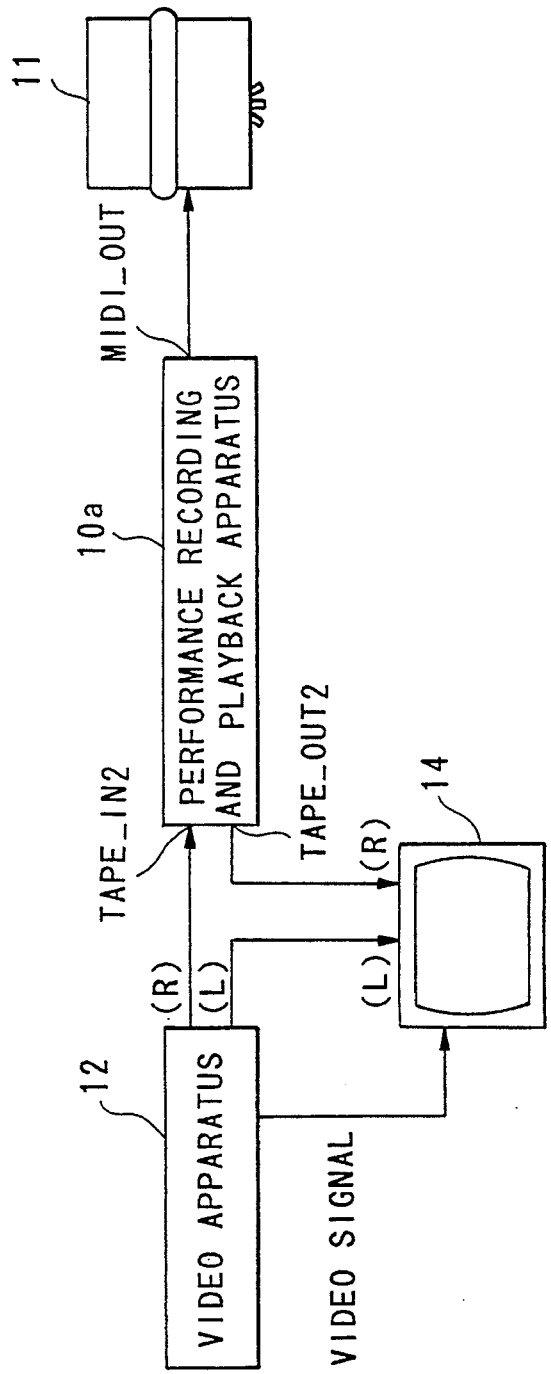
FIG. 9 is a block diagram showing an audio/video recording and playback system accompanied with a second embodiment of the present invention.

Next, a second embodiment of the present invention will be described. FIG. 9 is a block diagram showing a whole configuration of the audio/video recording and playback system based on the second embodiment of the present invention. The system configuration shown in FIG. 9 corresponds to the playback operation of the musical performance. In a performance recording and playback apparatus 10a, an input terminal "TAPE_IN2" is connected to be accessible to the right-side audio channel of the video apparatus 12, while an output terminal "TAPE_OUT2" is connected to be accessible to a right-side audio channel provided for a television (i.e., TV) 14. As similar to the first embodiment, an output terminal "MIDI_OUT" of the apparatus 10a is connected with a musical instrument such as the automatic piano 11 (i.e., automatic player piano). The automatic piano 11 performs the music based on the musical performance data which is written by a MIDI format. Further, a left-side audio channel of the video apparatus 12 is connected with a left-side audio channel of the TV 14. Furthermore, a video output terminal of the video apparatus 12 is connected with a video input terminal of the TV 14.

In the video tape which is used in the video apparatus 12, analog modulated musical performance signals (hereinafter, simply referred to as analog modulation signals, i.e., analog modulated MIDI signals) are recorded on the right-side audio track, while the other audio signals are recorded on the left-side audio track. When playing back the video tape, all of the MIDI signal, audio signal and video signal are simultaneously reproduced from respective tracks. The video signal and audio signal are supplied to the TV 14. Thus, a display monitor of the TV 14 displays the video image, while the corresponding musical performance (or audio sound) is sounded from a left-side speaker provided in the TV 14.

On the other hand, the signal recorded on the right-side audio track of the video tape is delivered to the apparatus 10a, so that the apparatus 10a discriminates the contents of the signals supplied thereto. If the input signal is the analog modulation signal (i.e., MIDI signal), this signal is converted into the MIDI data, which is outputted to the automatic piano 11. Thus, the automatic piano 11 can play the automatic performance in synchronism with the video image displayed on the monitor of the TV 14.

In contrast, if the input signal of the apparatus 10a which is supplied from the video apparatus 12 is the audio signal other than the MIDI signal, the apparatus 10a directly transmits it to the right-side channel of the TV 14. On the basis of this audio signal, the audio sound or the music which corresponds to the video image displayed on the monitor is produced from the right-side speaker of the TV 14.

Figure 10:
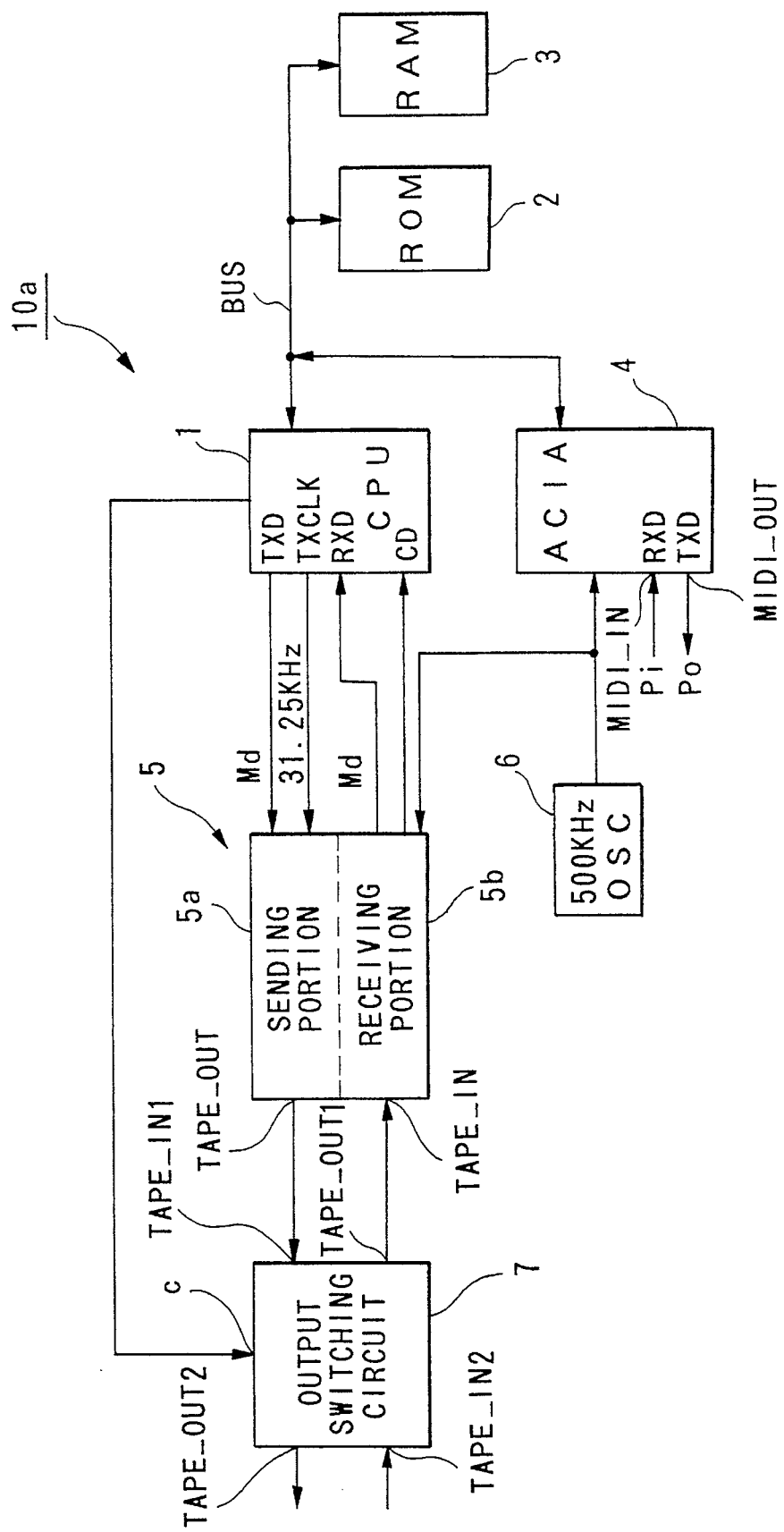
FIG. 10 is a block diagram showing an electronic configuration of a performance recording and playback apparatus according to the second embodiment of the present invention.

Next, an electronic configuration of the performance recording and playback apparatus 10a will be described in detail. FIG. 10 is a block diagram showing the electronic configuration of the apparatus 10a, wherein parts identical to those shown in FIG. 2 will be designated by the same numerals, hence, description thereof will be omitted. Different from the foregoing first embodiment, the second embodiment is characterized by that the CPU 1 discriminates kinds of the input signals supplied from the video apparatus 12 so as to control an output switching circuit 7, which is provided between the transmission portion 5 and the video apparatus 12, on the basis of a discrimination result.

In FIG. 10, the output switching circuit 7 provides an input terminal "TAPE_IN1" and an output terminal "TAPE_OUT1" which are respectively connected with the terminals TAPE_OUT and TAPE_IN of the transmission portion 5. In addition, the output switching circuit 7 further provides an input terminal "TAPE_IN2" and an output terminal "TAPE_OUT2" which are connected with the external device such as the video apparatus 12. Incidentally, a control signal produced from the CPU 1 is supplied to an input terminal C of the output switching circuit 7.

Figure 11:
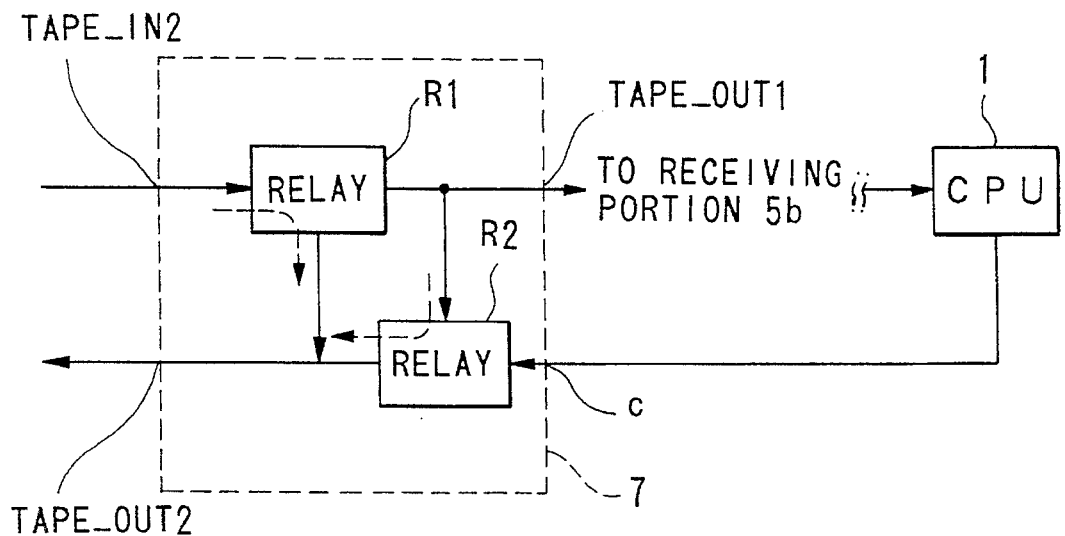
FIG. 11 is a block diagram showing a detailed configuration of an output switching circuit shown in FIG. 10.

FIG. 11 shows a detailed configuration of the output switching circuit 7. Herein, numerals R1 and R2 designate relays. The relay R1 is set in an ON state as long as the power is applied to the apparatus 10a. Thus, the input signal which is produced from the video apparatus 12 and then supplied to the input terminal TAPE_IN2 of the output switching circuit 7 is passed through the relay R1 and then outputted to the receiving portion 5b from the output terminal TAPE_OUT1. On the other hand, when the power is not applied to the apparatus 10a, the relay R1 is switched off, so that the input signal produced from the video apparatus 12 is not supplied to the receiving portion 5b. In this case, the input signal is outputted to the TV 14 from the output terminal TAPE_OUT2. On the other hand, the relay R2 is switched on or off in response to the control signal which is produced from the CPU 1 and is supplied thereto via the input terminal C. In the case where the input signal applied to the input terminal TAPE_IN2 indicates a normal audio signal, the input signal is outputted to the output terminal TAPE_OUT2 by the switching operation of the relay R2.

Next, an operation of the output switching circuit 7 will be described in detail by referring to a flowchart shown in FIG. 12.

Figure 12:
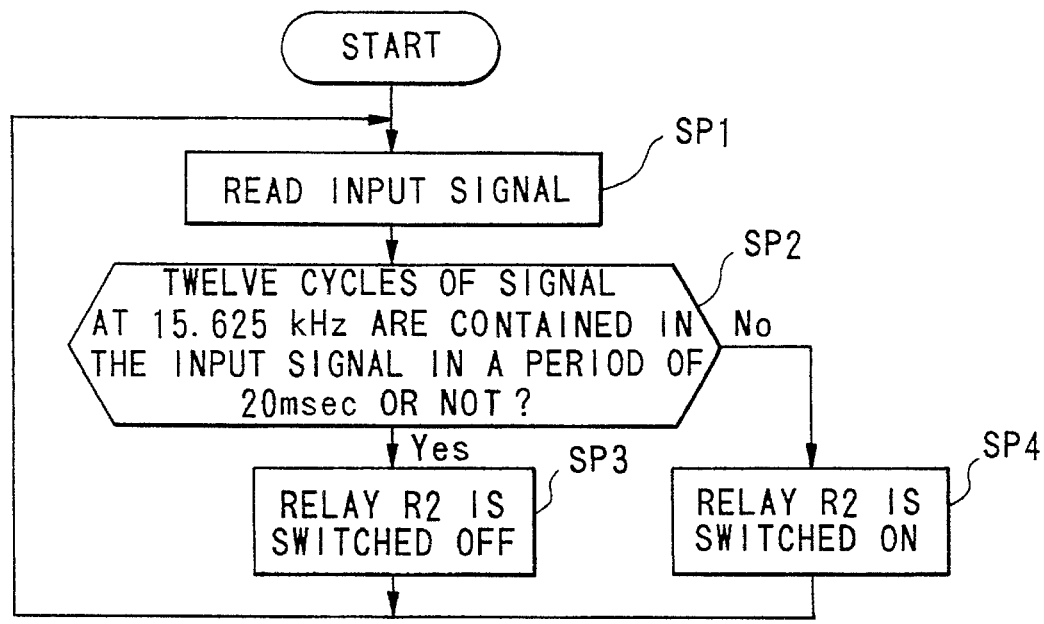
FIG. 12 is a flowchart showing an control operation of the output switching circuit.

In FIG. 12, when a processing of the CPU 1 proceeds to step SP1, the CPU 1 inputs the analog input signal supplied from the video apparatus 12. In next step SP2, it is judged whether or not a predetermined number of pulses corresponding to continuous twelve periods of the pulse signal having a constant frequency 15.625 kHz are included in the input signal which is supplied to the CPU 1 in a time 20 ms. In other words, by detecting a carrier-wave part of the MIDI signal to be included in the input signal, it is judged whether or not the input signal is the analog modulation signal. Herein, the carrier-wave part indicates a part of the MIDI signal which is not subjected to analog modulation.

Figure 13:
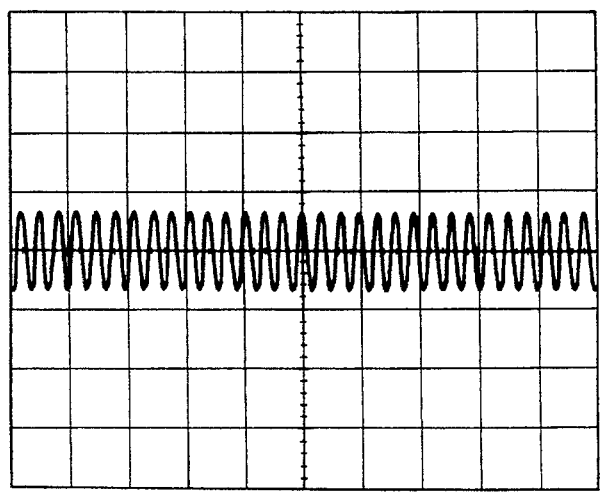
FIG. 13 shows an example of a waveform of a carrier wave, monitored by an oscilloscope, which is used for a MIDI signal.
Figure 14:
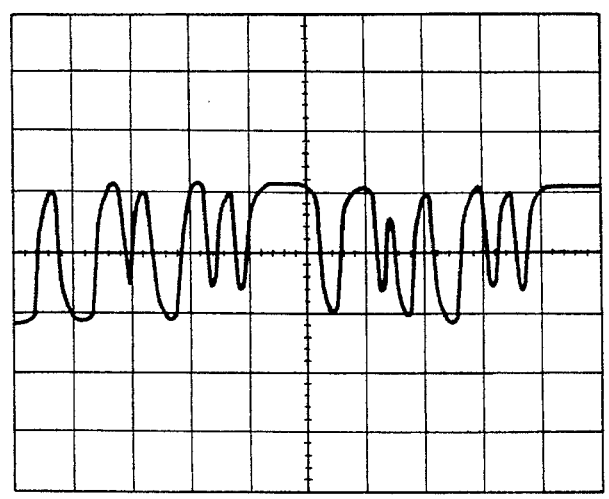
FIG. 14 shows an example of a waveform of a MIDI signal, monitored by an oscilloscope, which corresponds to plural sounds to be simultaneously produced.

Next, a description will be given with respect to a reason why the analog modulation signal can be discriminated from the other signals by the judgement process of step SP2. Now, when the MIDI data is subjected to analog modulation by use of the carrier wave at 15.625 kHz of which waveform is shown in FIG. 13, the analog modulation signal as shown in FIG. 3 or 4 is obtained. In the case of the analog modulation signal corresponding to the MIDI data which represents a plurality of sounds to be simultaneously produced, the carrier-wave part is not emerged for a relatively long time as shown in FIG. 14. However, during the aforementioned time 20 ms, twelve cycles of the carrier wave should be inevitably and continuously emerged in the analog modulation signal. The reason will be described below.

In the performance information created by the automatic piano 11, one sound is recorded by three bytes of the MIDI data. A time required for transferring the MIDI signal corresponding to one sound is set at 960μ sec. In addition, the automatic piano 11 is designed such that a maximum number of the sounds to be simultaneously produced is set at sixteen. Therefore, a time required for transferring the MIDI signals corresponding to sixteen sounds which are simultaneously produced from the automatic piano 11 can be calculated by multiplying the above-mentioned time 960μ sec by "16". In other words, a time corresponding to the analog modulation signals, representing the sixteen sounds to be simultaneously produced, which are continuously transferred is equal to 15.36 ms. Moreover, in the performance recording operation of the automatic piano 11, key operations are scanned by scanning period of 4 ms. Thus, a time interval between two MIDI signals representing the sounds which are sequentially produced should be equal to or larger than 4 ms. These facts regarding the characteristic of the automatic piano 11 indicate that twelve cycles of the carrier wave must be continuously emerged in the input signal during the time 20 ms.

Figure 15:
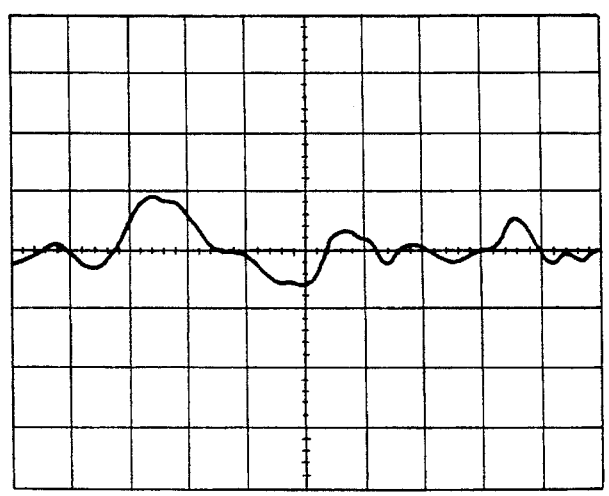
FIG. 15 shows an example of a waveform of an audio signal monitored by an oscilloscope.

In contrast, when the input signal represents the audio signal of which waveform is shown in FIG. 15, twelve cycles of the carrier wave (having the carrier frequency 15.625 kHz as shown in FIG. 13) cannot be continuously emerged in the input signal during 20 ms. Thus, the judgement process of step SP2 can discriminate the analog modulation signal, which is derived from the MIDI data, from the other audio signals.

In step SP2 shown in FIG. 12, when it is detected that the continuous twelve cycles of the carrier wave at 15.625 kHz are emerged in the input signal in 20 msec, the judgement result turns to "YES", representing that the input signal is the analog modulation signal (i.e., analog modulated MIDI signal). In this case, the processing of the CPU 1 proceeds to step SP3. In step SP3, the relay R2 is switched off. Thus, the analog modulation signal is supplied to the receiving portion 5b wherein it is converted into the MIDI data, which is read by the CPU 1. Then, the CPU 1 delivers the MIDI data to the automatic piano 11 by means of the ACIA 4. Thereafter, the processing of the CPU 1 returns back to the foregoing step SP1.

On the other hand, if the continuous twelve cycles of the carrier wave at 15.625 kHz are not included in the input signal in 20 msec, the judgement result of step SP2 turns to "NO", representing that the input signal is the audio signal other than the analog modulation signal (i.e., analog modulated MIDI signal). In this case, the processing branches to step SP4 wherein the relay R2 is switched on. Thus, the audio signal supplied from the video apparatus 12 is directly outputted to the output terminal TAPE_OUT2 of the output switching circuit 7, from which the audio signal is supplied to the TV 14. Then, the processing of the CPU 1 returns back to the foregoing step SP1.

As described above, the CPU 1 judges whether the input signal supplied from the video apparatus 12 is the analog modulation signal or another audio signal. Based on the judgement result, the relay R2 is switched on or off. When the input signal is the analog modulation signal, the corresponding MIDI data is outputted to the automatic piano 11. On the other hand, when the input signal is the audio signal, the audio signal is directly transmitted to the TV14.

According to the second embodiment, by discriminating the input signal supplied from the video apparatus 12, the output destination for the input signal can be automatically changed in response to the playback instruction determining whether or not the analog modulation signal recorded at one-side audio channel of the video tape is played back. Thus, in the system as shown in FIG. 9, it is possible to selectively play back the MIDI signal or the audio signal in synchronism with the video image without changing the system configuration.

For instance, under the state where both of the left-side and right-side audio channels of the video apparatus 12 are connected to the TV 14, it is possible to play back the video tape in which the analog modulation signal is recorded. In this case, it is possible to prevent jarring sounds corresponding to the analog modulation signal from being produced from the speaker of the TV 14 by mistake.

In the second embodiment, the TV 14 is connected with the one-side audio channel of the video apparatus 12 as shown in FIG. 9. However, it is possible to modify the system configuration. For example, an amplifier can be connected with the one-side audio channel of the video apparatus 12.

Of course, it is possible to re-connect the system such that the recording/playback operations of the analog modulation signal or of the audio signal is carried out by the left-side channel other than the right-side channel.

[C] Third Embodiment

Figure 16:
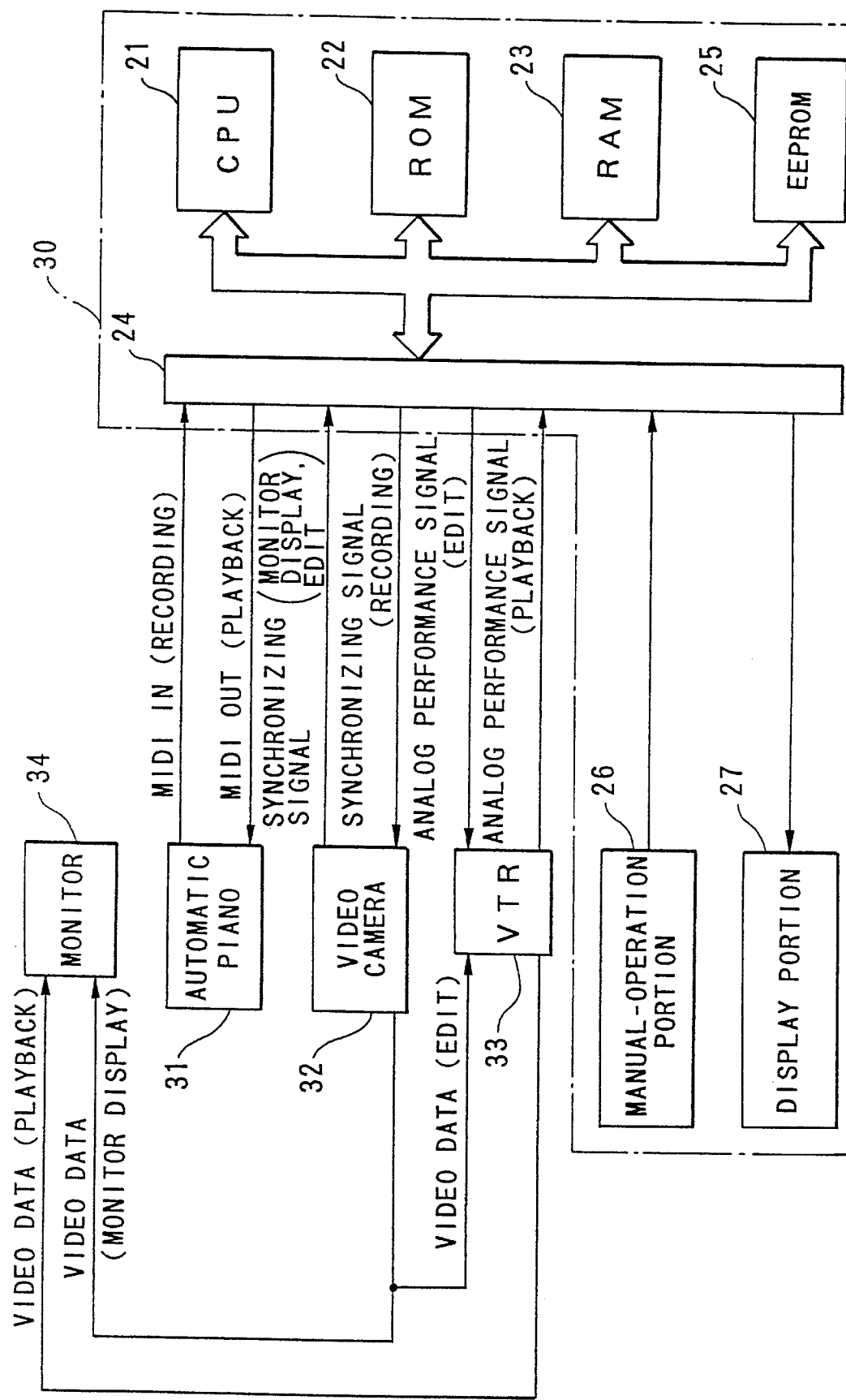
FIG. 16 is a block diagram showing a whole configuration of the audio/video recording and playback system accompanied with a third embodiment of the present invention.

FIG. 16 is a block diagram showing an audio/video recording and playback system accompanied with a third embodiment of the present invention. In FIG. 16, a CPU 21 is provided to control several portions linked together by a bus in the circuitry of a performance recording and playback apparatus 30. A ROM 22 stores several kinds of control programs which are loaded by the CPU 21. A RAM 23 is used as a work area of the CPU 21, so that several kinds of register values or performance data are temporarily stored in the RAM 23.

An input/output portion 24 is provided to control the input/output operations with respect to the external devices, which will be described later. This input/output portion 24 provides a pair of a MIDI input terminal "MIDI_IN" and a MIDI output terminal "MIDI_OUT", and this portion 24 also provides another pair of an input terminal "TAPE_IN" and an output terminal "TAPE_OUT" which are connected to a video camera 32 or a VTR 33. This input/output portion 24 also functions to perform an analog modulation on the performance data, supplied from an EEPROM 25 (i.e., electrically erasable and programmable read-only memory), when editing the performance data. In the playback state, the input/output portion 24 decodes the analog modulation signal into the digital data. The EEPROM 25 stores a set of the performance data which are transferred from the RAM 23 at once when the recording operation is ended.

Further, a numeral 26 designates an manual-operation portion (or manual-operation panel) which provides several kinds of manual-operable switches such as a power switch (designating a power-on/off state), a recording switch (designating an on/off state for the recording operation of the musical performance) and a transmission switch (designating an on/off state for an editing operation on VTR). The manual-operation portion 26 produces an manual-operation signal corresponding to a manual operation applied to each of the switches. Further, a display portion 27 is configured by a liquid-crystal display (LCD) or the like. This display portion 27 displays the contents of several kinds of data which are supplied thereto from the CPU 21 by means of the input/output portion 24. The above-mentioned circuit portions 21 through 27 are assembled together to configure the performance recording and playback apparatus 30 according to the third embodiment of the present invention.

Next, an automatic piano 31 (i.e., an automatic player piano) produces the performance data (i.e., MIDI signal) in the recording operation, and then, the performance data is outputted to the input/output portion 24. In the playback operation, the automatic piano 31 plays an automatic performance on the basis of the performance data which is supplied from the input/output portion 24. The video camera 32 contains a video tape having a tape width 8 mm. This video camera 32 takes pictures of the performance scenes of the automatic piano 31, for example. The video data corresponding to the performance scene is recorded on the video tape together with the synchronizing signal which is supplied to the video camera 32 from the CPU 21 by means of the input/output portion 24.

Meanwhile, the video data is transferred to the VTR 33 from the video camera 32 in the VTR-editing operation. Thus, the VTR 33 records the video data on the video track of the video tape (e.g., VHS video tape), while the analog modulation signal corresponding to the performance data is recorded on the audio track of the video tape. When playing back the musical performance, the VTR 33 reproduces the video data (which is recorded on the video track of the video tape) so as to display it on a monitor 34. In addition, the performance data which is recorded on the audio track of the video tape is also reproduced and then supplied to the input/output portion 24.

Next, the operations of the performance recording and playback apparatus 30 will be described in detail. Herein, the present embodiment provides four kinds of operations, i.e., "recording operation", "VTR-editing operation", "playback operation" and "monitor-displaying operation".

(1) Recording Operation

Figure 17:
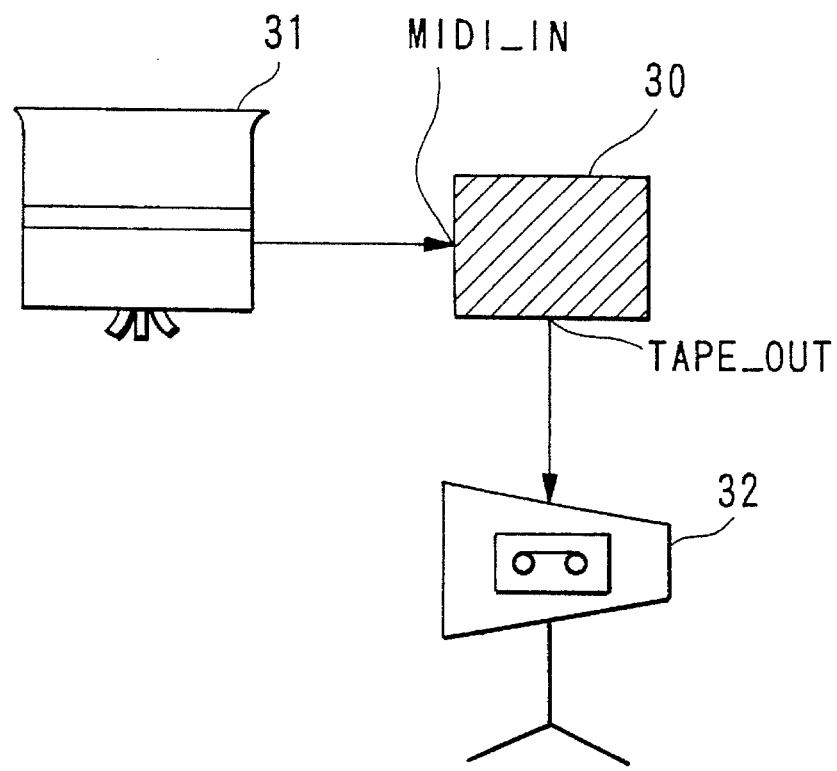
FIG. 17 is a drawing showing a connected state of the system when performing a recording operation.

In the recording operation, the input terminal MIDI_IN of the apparatus 30 is connected with the automatic piano 31, while the output terminal TAPE_OUT of the apparatus 30 is connected with the video camera 32 as shown in FIG. 17. After the power switch is turned on, the recording switch is turned on at a moment which is some seconds before the performance start timing.

Thereafter, the musical performance is started. Thus, the automatic piano 31 sequentially outputs the MIDI signals in response to the performing operations effected on the keys of the keyboard. The MIDI signal is supplied to the CPU 21 by means of the input terminal MIDI_IN and the input/output portion 24. In the CPU 21, each of the MIDI signal provides time data representing a tone-generation timing for each of the musical notes to be sounded. Then, the MIDI signals each accompanied with the time data are sequentially stored in the RAM 23 as the performance data. In the meantime, the CPU 21 produces a synchronizing signal on the basis of the MIDI signal supplied from the automatic piano 31. This synchronizing signal is added with data representing a serial number applied to the tune to be played (hereinafter, simply referred to as a tune number). Then, the synchronizing signal accompanied with the above-mentioned data is outputted to the video camera 32 via the output terminal TAPE_OUT. On the other hand, the video camera 32 takes the pictures of the performance scenes. The video data corresponding to the performance scene is recorded on a 8 mm video tape together with the synchronizing signal which is supplied to the video camera 32 from the output terminal TAPE_OUT of the apparatus 30.

When the musical performance is ended and the recording switch is turned off, the CPU 21 produces a stop signal. This stop signal emerged at the output terminal TAPE_OUT of the apparatus 30 is supplied to the video camera 32, so that the recording operation of the video camera 32 is stopped. On the other hand, the performance data is read from the RAM 23, while a data value corresponding to 500 ms is subtracted from the time data corresponding to a note which is firstly produced. Then, the performance data containing the time data on which the above-mentioned subtraction is performed is transferred to the EEPROM 25. As described above, the video data is recorded by the video camera 32 together with the synchronizing signal, while the performance data is firstly subjected to a correcting operation (i.e., subtraction of 500 ms which corresponds to a delay amount in connection with the tone-generation timing of the automatic piano 11) and then stored in the EEPROM 25. Thus, even if the power switch of the apparatus 30 is turned off, the performance data can be stored without being erased.

(2) VTR-editing Operation

Figure 18:
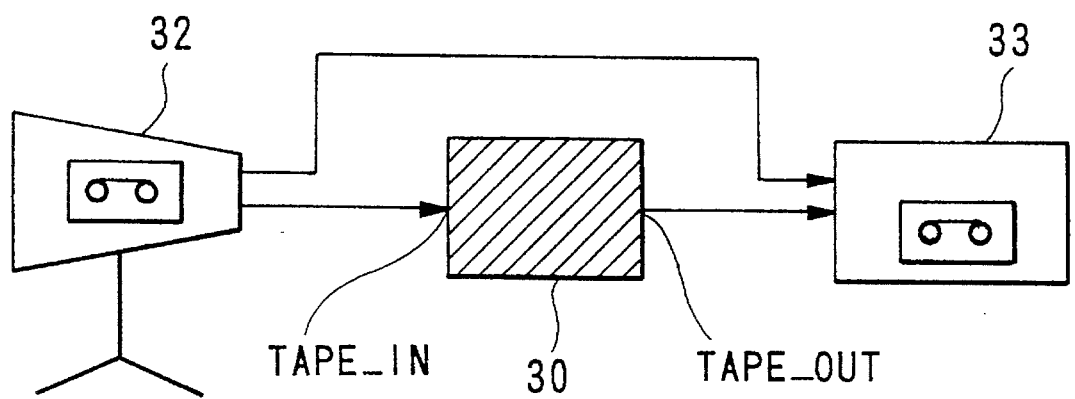
FIG. 18 is a drawing showing a connected state of the system when performing a VTR-editing operation.

When performing the VTR-editing operation after performing the recording operation, the video camera 32 is connected to the input terminal TAPE_IN of the apparatus 30, while the VTR 33 is connected to the output terminal TAPE_OUT of the apparatus 30 as shown in FIG. 18. Further, in order to transfer the video data, the output terminal of the video camera 32 is connected with the input terminal of the VTR 33.

After connecting the apparatus 30, the video camera 32 and the VTR 33 as shown in FIG. 18, the power switch is turned on, and then, the transmission switch is also turned on. Thus, the video data and the synchronizing signal which are recorded by the video camera 32 are read out. In this case, the video data is directly transferred to the VTR 33, while the synchronizing signal is supplied to the CPU 21 via the input terminal TAPE_IN. Thus, the performance data which corresponds to the data, included in the synchronizing signal, representing the tune number is read from the EEPROM 25. Such performance data is subjected to analog modulation by the input/output portion 24, and then, the analog modulation signal is supplied to the VTR 33. In the VTR 33, the video data which is transferred from the video camera 32 is written on the video track of the video tape, while the analog modulation signal corresponding to the performance data is written on the audio track of the video tape.

Thus, the video data and the analog modulation signal (corresponding to the performance data) are recorded on the same recording medium (i.e., video tape) in synchronism with each other by the VTR 33. Thereafter, when all of the data are completely transferred to the VTR 33 so that the operator turns off the transmission switch, the VTR-editing operation is ended.

(3) Playback Operation

Figure 19:
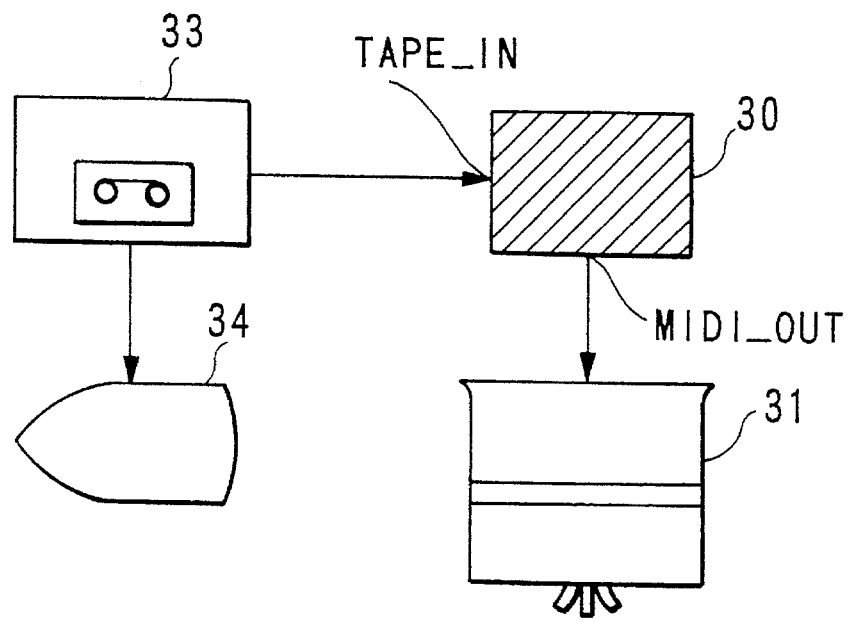
FIG. 19 is a drawing showing a connected state of the system when performing a playback operation.

Next, when performing the playback operation after performing the VTR-editing operation, the VTR 33 is connected to the input terminal TAPE_IN of the apparatus 30, while the automatic piano 31 is connected to the output terminal MIDI_OUT of the apparatus 30 as shown in FIG. 19.

Thereafter, the power switch is turned on, and then, the playback switch is turned on. Thus, the VTR 33 reads out the analog modulation signal from the audio track of the video tape in parallel with the playback operation of the video data. The analog modulation signal read from the VTR 33 is outputted to the apparatus 30. The analog modulation signal which is inputted into the input/output portion 24 via the input terminal TAPE_IN is converted into the digital data (i.e., performance data), which is supplied to the automatic piano 31. According to the system shown in FIG. 19, it is possible to display the video image on the monitor 34 and also play the automatic performance on the automatic piano 31 by merely playing back the video tape by the VTR 33.

(4) Monitor-displaying Operation

Incidentally, it is possible to perform the monitor-displaying operation by use of the video camera 32 without performing the VTR-editing operation after performing the recording operation. In this case, the video camera 32 is connected to the input terminal TAPE_IN of the apparatus 30, while the automatic piano 31 is connected to the output terminal MIDI_OUT of the apparatus 30 as shown in FIG. 20.

Figure 20:
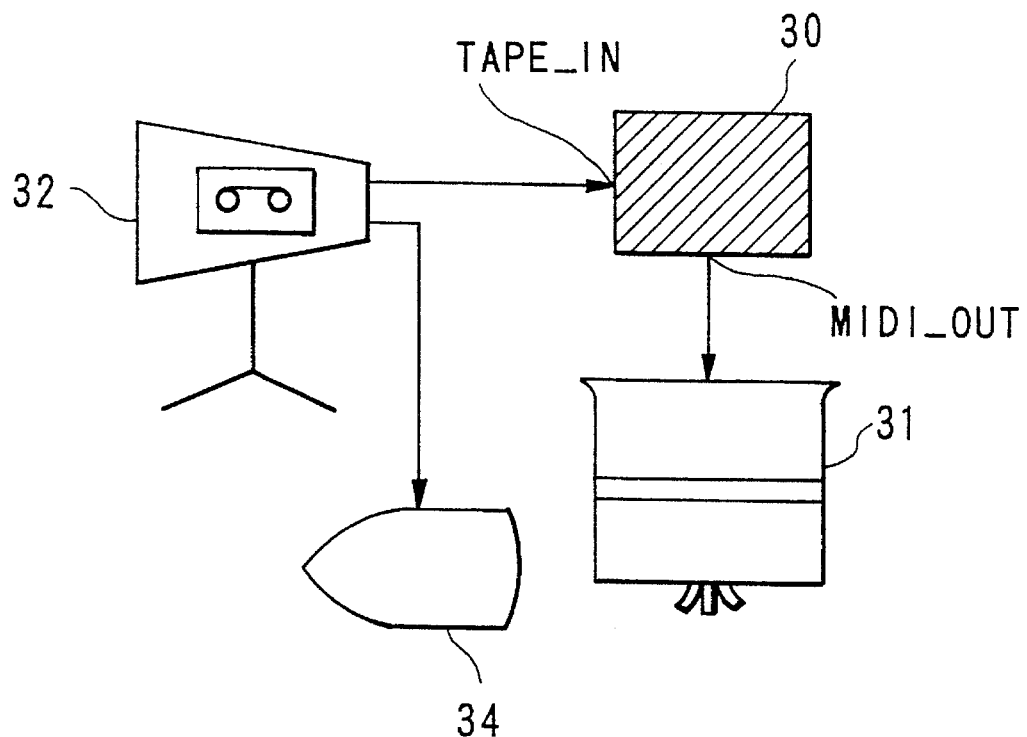
FIG. 20 is a drawing showing a connected state of the system when performing a monitor-displaying operation.

After connecting the system as shown in FIG. 20, the power switch is turned on, and then, the monitor switch is turned on. Thus, the video data is transferred from the video camera 32 to the monitor 34. At the same time, the video camera 32 outputs the synchronizing signal, which is supplied to the CPU 21 via the input terminal TAPE_IN. Thus, the performance data which corresponds to the data, included in the synchronizing signal, representing the tune number is read from the EEPROM 25 in synchronism with the synchronizing signal. The performance data read from the EEPROM 25 is supplied to the automatic piano 31 via the output terminal MIDI_OUT. Thus, the automatic performance is carried out by the automatic piano 31 in synchronism with the performance scene which is displayed on the monitor 34.

According to the present embodiment described heretofore, in the recording operation, the performance data is corrected by a data value corresponding to the delay amount of 500 ms relating to the tone-generation timing of the automatic piano 31, and then, the corrected performance data is stored in the EEPROM 25. Thus, in the playback operation or the monitor-displaying operation, it is possible to accurately play the automatic performance on the automatic piano 31 in synchronism with the displayed image without causing any delays on the tone-generation timings of the musical sounds.

In addition, the performance data is stored in the EEPROM 25 when ending the recording operation. Therefore, even if the power supply to the apparatus 30 is stopped after the recording operation, the performance data is not eliminated and perfectly stored.

If the aforementioned VTR-editing operation is performed after the recording operation, both of the video data and the performance data are recorded on the same video tape. Thus, it is possible unify the recording medium.

As described before, the synchronized recording and playback operations can be achieved by merely connecting the performance recording and playback apparatus 30 with the external device. Thus, the connecting operation among the devices in the system can be performed easily as compared to the conventional system. Further, the recording medium can be unified. As a result, it is possible to remarkably improve the performability of the system.

In order to simplify the description of the present embodiment, a correction value which is applied to the time data is set identical to the tone-generation delay time 500 ms of the automatic piano 31. However, the correction value is not limited to that value. For example, it is possible to further provide a manual-operable member, by which the correction value can be arbitrarily set, on the manual-operation portion 26. In this case, the tone-generation timing can be corrected in response to the correction value designated by the operator. Herein, it is possible to set the correction value at "0". By use of such manual-operable member, the present system can employ the electronic musical instrument, instead of the automatic piano.

[D] Fourth Embodiment

Next, a fourth embodiment of the present invention will be described below.

Figure 21:
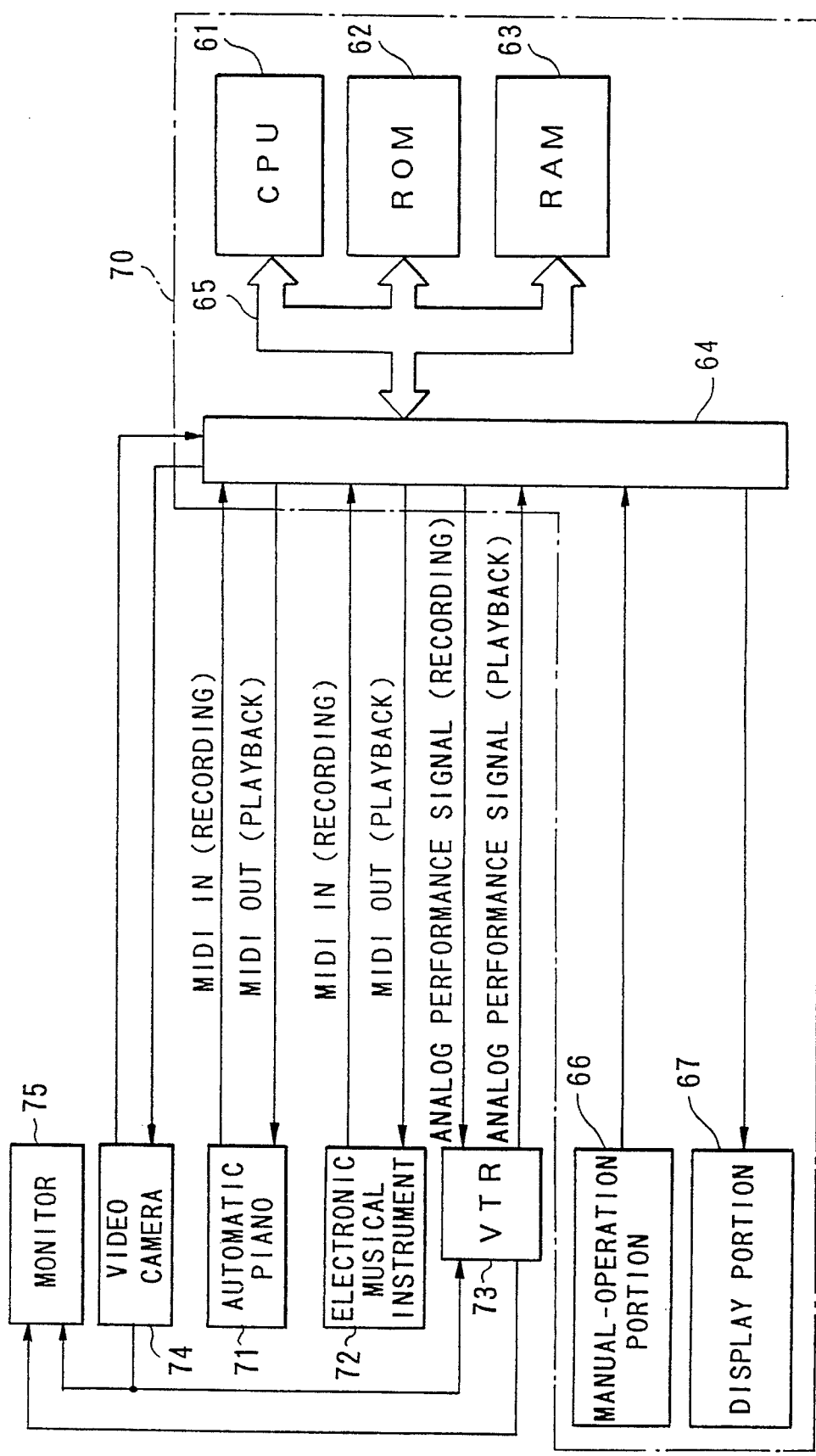
FIG. 21 is a block diagram showing an audio/video recording and playback system accompanied with a fourth embodiment of the present invention.

FIG. 21 is a block diagram showing an electronic configuration of the audio/video recording and playback system accompanied with the fourth embodiment of the present invention. In FIG. 21, a CPU 61 controls several portions, linked together by a bus 65, in the circuitry of a tone-generation timing correcting apparatus 70. A ROM 62 stores several kinds of programs which are loaded to the CPU 61.

A RAM 63 is used as a work area for the CPU 61. Several kinds of results of the performance or several kinds of register values are temporarily stored in the RAM 63. An input/output portion 64 controls the input/output operation with respect to the external device. A VTR 73 performs the analog modulation on the MIDI signal given from an automatic piano 71 (i.e., an automatic player piano) so as to record the analog modulation signal on the video tape. In the playback operation, the VTR 73 decodes the analog modulation signal to the digital signal.

A manual-operation portion 66 provides several kinds of manual-operable members. A display portion 67 is configured by the liquid-crystal display (i.e., LCD). This display portion 67 displays the contents of the several kinds of data which are supplied thereto from the CPU 61 by means of the input/output circuit 64. The above-mentioned circuit portions 61 through 67 are assembled together to configure the tone-generation timing correcting apparatus 70.

When recording the musical performance, the automatic piano 71 produces the performance data corresponding to the performance played by the performer, and this performance data is outputted to the input/output portion 64. In the reproducing operation, the automatic piano 71 carries out an automatic performance in response to the performance data which is supplied thereto by means of the input/output portion 64. As similar to the automatic piano 71, in the recording operation, an electronic musical instrument 72 produces the performance data corresponding to the performance played by the performer, and this performance data is outputted to the input/output portion 64. In the reproducing operation, the electronic musical instrument 72 produces musical tones corresponding to the performance data which are supplied thereto from the input/output portion 64.

In the recording operation, the VTR 73 records the video data, representing the performance scenes which are taken by a video camera 74, on the video track of the video tape, while the VTR 73 also records the performance data, given from the input/output portion 64, on the audio track of the video tape. In the playback operation, the VTR 73 plays back the video data which is pre-recorded on the video track of the video tape, so that the video data is displayed on a monitor 75, while the performance data is also played back from the audio track of the video tape so that the performance data is outputted to the input/output portion 64.

Next, the operations of the present system will be described in detail by referring to two operational states, i.e., "recording of performance" and "playback of performance".

(1) Recording of Performance

When recording the performance, each of the automatic piano 71 and the electronic musical instrument 72 produces the performance data, so that the performance data is transferred to the VTR 73, which is now recording the performance scenes, by means of the input/output portion 64. In this case, the recording operation of the VTR 73 is started at a moment which is at least some seconds prior to a timing to start the performance.

The performance data outputted from the automatic piano 71 is recorded on the right-side audio track of the video tape, while another performance data outputted from the electronic musical instrument 72 is recorded on the left-side audio track of the video tape, for example. In short, each of these performance data is independently recorded on a different channel of the VTR 73. Thus, all of the video data (representing the performance scenes) and two kinds of performance data (which are respectively outputted from the automatic piano 71 and the electronic musical instrument 72) are recorded on the same video tape in parallel.

(2) Playback of Performance

When playing back the performance, the VTR 73 reads out the two kinds of performance data from both of the audio tracks (corresponding to the left-side and right-side channels) while simultaneously playing back the video data. These performance data are supplied to the input/output portion 64. In the input/output portion 64, one of these performance data which is read from the left-side audio track is directly delivered to the electronic musical instrument 72. Thus, the electronic musical instrument 72 can produce the musical tones in response to the performance data which are sequentially supplied thereto from the input/output portion 64.

On the other hand, another performance data which is read from the right-side audio track is subjected to an operational process by the CPU 61.

Figure 22:
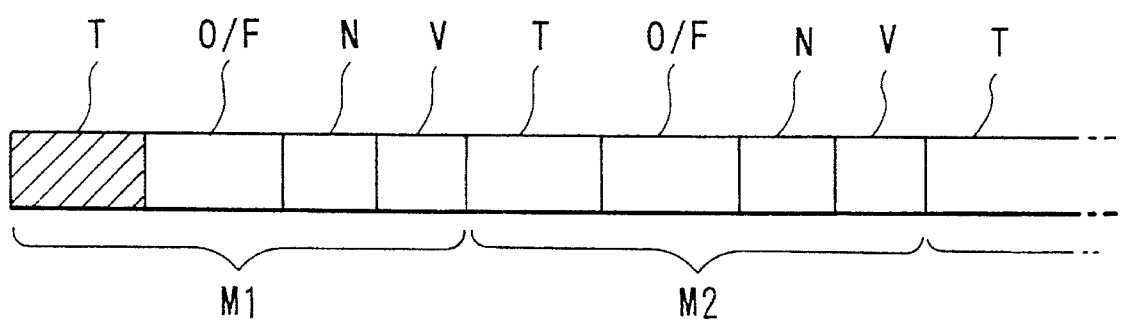
FIG. 22 shows a data format of the performance data.

The performance data which should be delivered to the automatic piano 71 has a data format as shown in FIG. 22. This performance data consists of a plurality of note data M1, M2, . . . each representing the musical information provided for each of the notes. More specifically, each note data consists of time data T, note-on/note-off data O/F, note-number data N and velocity data V. Herein, the time data T represents a relative time interval between a current note-on/off event and a preceding note-on/off event; the note-on/note-off data OF represents a tone-generation instruction or a tone-elimination instruction; the note-number data N represents a name of the note; and the velocity data V represents a tone-generation intensity.

In the above-mentioned performance data, the CPU 61 subtracts a time value of 500 ms from the time data T which is included in a first note data M1. Then, the result of the subtraction is supplied to the automatic piano 71 as corrected time data. The other note data M2, M3, . . . are not subjected to the operational process (i.e., subtraction) by the CPU 61, so that these data are sequentially supplied to the automatic piano 71 without being corrected.

As a result of the above-mentioned operational process performed by the CPU 61, all of the timings corresponding to all of the note data provided in the performance data are advanced by 500 ms. In other words, the tone-generation timings at which the musical tones are respectively produced from the automatic piano 71 are all advanced by 500 ms.

Figure 23:
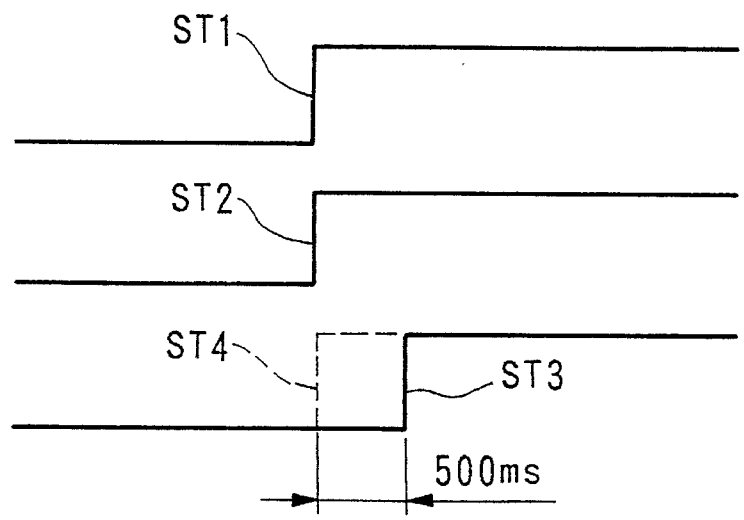
FIG. 23 shows start timings to start playing back the musical performances by different devices.

FIG. 23 shows start timings to start the performances in the playback operation. Herein, ST1 represents a start timing at which the performance is played back by the VTR 73 in synchronism with the playback of the video display, while ST2 represents a start timing at which the performance of the electronic musical instrument 72 is started. As shown in FIG. 23, the start timing ST1 coincides with the start timing ST2. On the other hand, ST3 represents an original start timing at which the performance of the automatic piano 71 is played back, while ST4 represents a corrected start timing which is obtained by correcting the time data included in the note data of the performance data to be supplied to the automatic piano 71. Herein, there exists a time interval of 500 ms between the start timings ST3 and ST4. In other words, the corrected start timing ST4 is advanced from the original start timing ST3 by 500 ms. Due to the correction of the start timing to start playing back the performance by the automatic piano 71, the corrected start timing ST4 can coincide with the other start timings ST1 and ST2. As a result, it is possible to accurately carry out the synchronized playback operation among the automatic piano 71, the electronic musical instrument 72 and the VTR 73.

[E] Modifications

Next, modified examples of the present invention will be described by referring to FIGS. 24 and 25.

Figure 24:
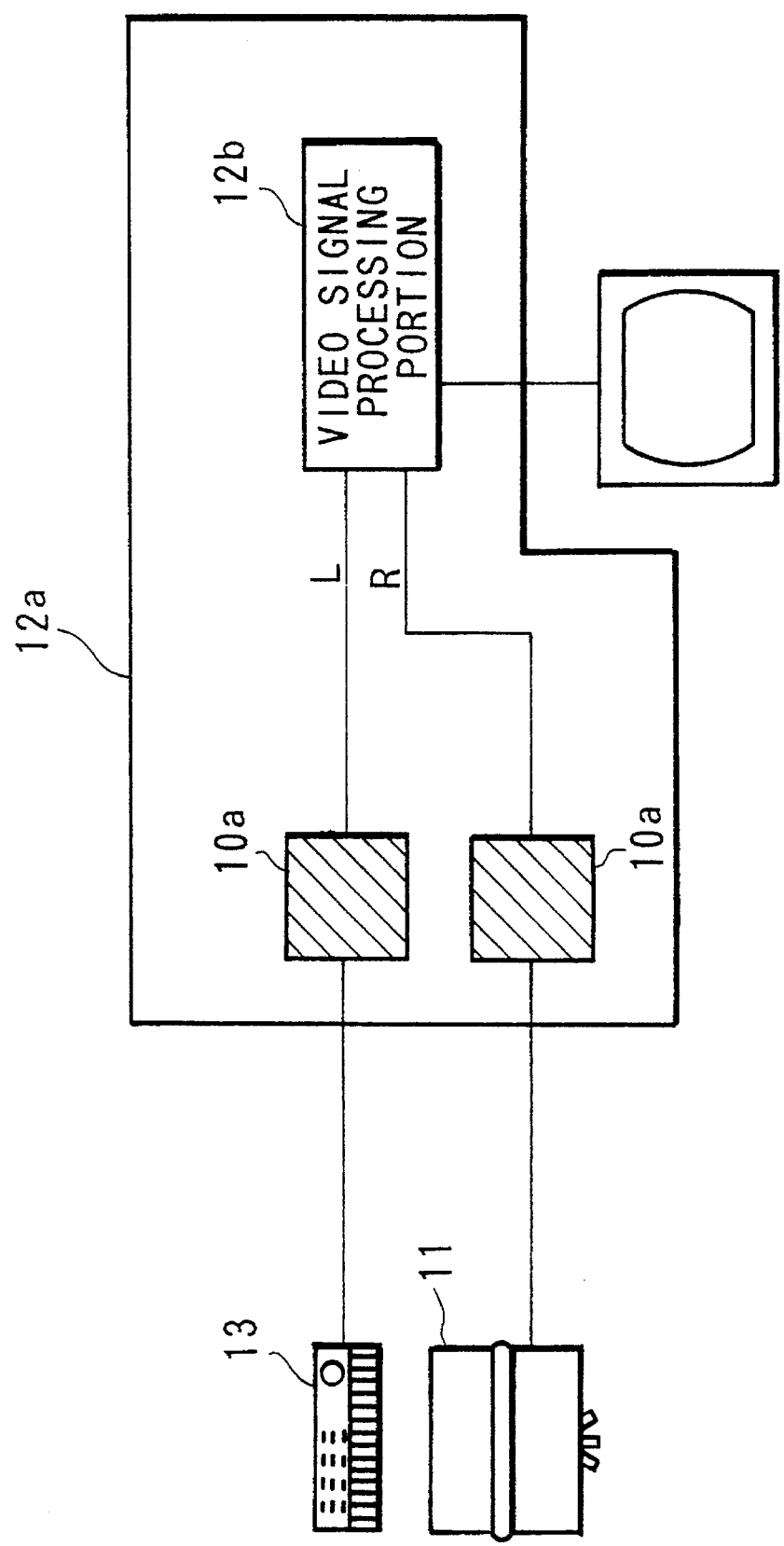
FIG. 24 is a block diagram showing a modified example of the present invention.

FIG. 24 is a block diagram showing a modified example of the present invention, wherein parts identical to those shown in FIG. 8 will be designated by the same numerals. Herein, a video cassette recorder 12a contains a performance recording and playback portion 10a and a video signal processing portion 12b. The musical performance data outputted from the automatic piano 11 (i.e., automatic player piano) is recorded on a right-side audio track of the video tape through the performance recording and playback portion 10a, while another musical performance data produced by the electronic musical instrument 13 is recorded on a left-side audio track of the video tape through the performance recording and playback portion 10a. The detailed structure and function of the performance recording and playback portion 10a are the same as of the foregoing performance recording and playback apparatus 10 which is explained with reference to FIGS. 2 to 7.

Figure 25:
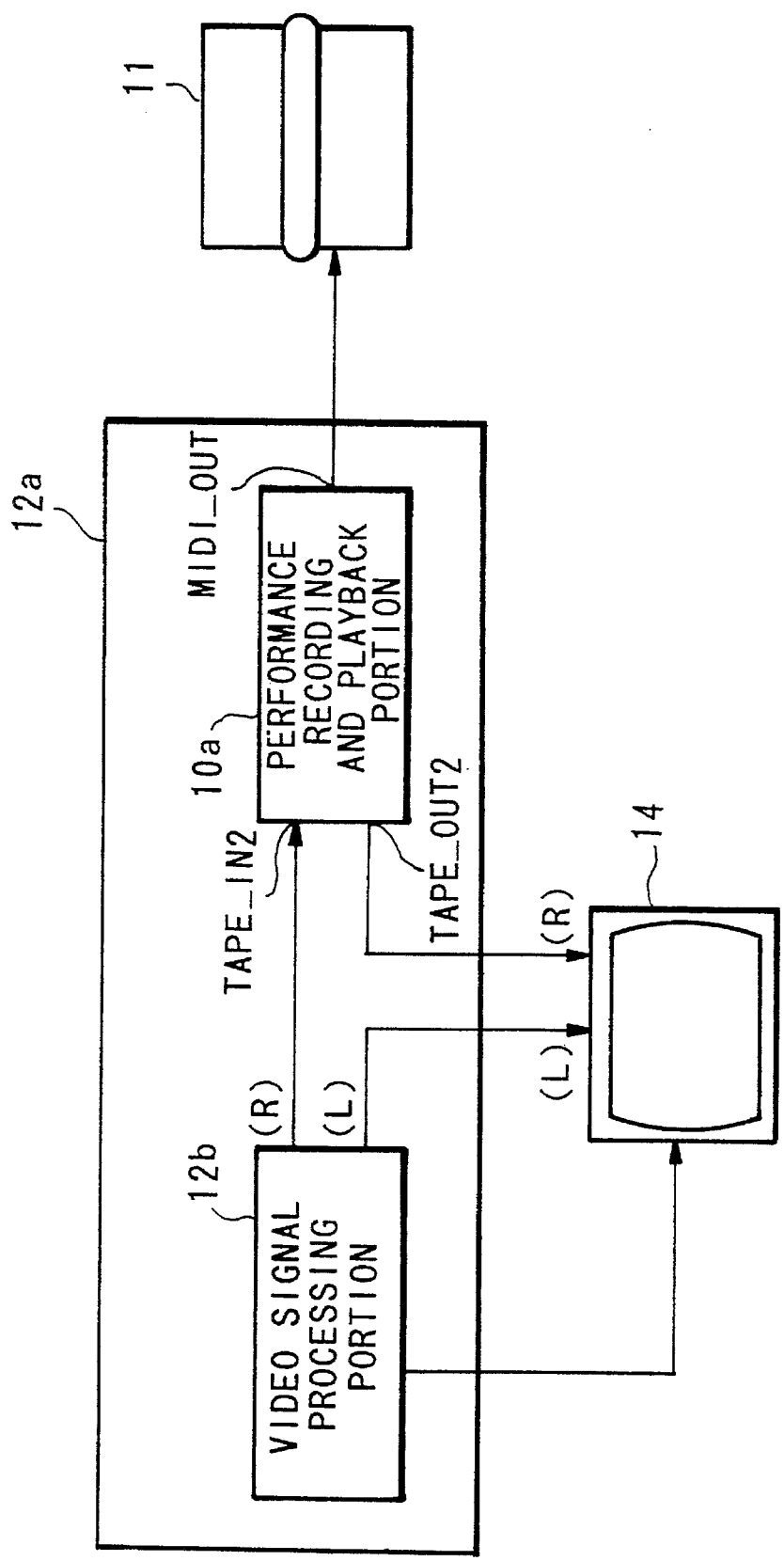
FIG. 25 is a block diagram showing another modified example of the present invention.

FIG. 25 is a block diagram showing another modified example of the present invention, wherein parts identical to those shown in FIG. 9 and FIG. 24 are designated by the same numerals. As similar to the system shown in FIG. 24, the performance recording and playback portion 10a is included in the video cassette recorder 12a. The performance recording and playback portion 10a receives signals outputted from the video signal processing portion 12b. Hence, the performance recording and playback portion 10a judges the characteristic of the signals inputted thereto. When the signal inputted is the musical performance signal, including MIDI-format musical performance information which can be discriminated from audio signal information, the performance recording and playback portion 10a directly outputs the input signal thereof to the automatic piano 11 (i.e., automatic player piano) from the terminal MIDI_OUT. In contrast, when the input signal is the audio signal other than the musical performance signal, the performance recording and playback portion 10a outputs the input signal thereof to a right-side speaker of the TV 14. In other words, the performance recording and playback portion 10a switches its output signal paths based on properties of the input signals.

In the present invention, a video tape is used as a recording medium to record the analog modulated MIDI signals. Other than the video tape, it is possible to employ a laser disk as a recording medium.

Incidentally, the correction value which is used for correcting the start timing of the automatic piano 71 (see FIG. 21) is not limited to a time value of 500 ms which corresponds to the tone-generation delay time of the automatic piano 71. Thus, it is possible to arbitrarily change the correction value by the operator as described before.

In the foregoing embodiment, the correction of the start timing is carried out in the playback operation. However, it is possible to modify the present system such that the correction of the start timing is carried out in the recording operation.

Lastly, this invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. An audio/video recording and playback system comprising:

a performance apparatus capable of producing and reproducing performance data;

a video apparatus capable of recording and playing back said performance data and video data and audio data, each on a separate respective channel of a single recording medium having a plurality of channels, said performance data and said audio data being supplied to and recorded by said video apparatus; and synchronizing means for controlling a recording operation of said video apparatus such that said performance data is recorded in synchronism with said video data, said synchronizing means including means for controlling a playback operation of said video apparatus and a reproducing operation of said performance apparatus such that said performance data is discriminated from said audio data, played back by said video apparatus, and supplied to said performance apparatus to be reproduced in synchronism with said video data.

2. An audio/video recording and playback system as defined in claim 1 wherein said performance apparatus is an automatic piano or an electronic musical instrument, while said video apparatus is a video tape recorder so that the recording medium is a video tape.

3. A performance recording and playback apparatus comprising:

input means for inputting performance data, audio data, and video data, said performance data being transferred from a performance device at a predetermined transfer rate, and said performance data representing a musical performance which is played by a performer who plays said performance device;

recording control means for controlling a recording operation of a recording device such that said performance data is transferred to said recording device at the predetermined transfer rate so that said performance data is recorded on a single recording medium having a plurality of channels together with said video data and said audio data, said performance data, said audio data, and said video data each being recorded on a separate respective channel of said recording medium; and playback control means for discriminating between said audio data and said performance data and for controlling a playback operation of said performance device such that said performance data which is played back from said recording medium is transferred to said performance device at the predetermined transfer rate so that said performance device plays back said performance data in synchronism with said video data which is played back from said recording medium and then displayed on a display device.

4. A performance recording and playback apparatus as defined in claim 3 further comprising:

a discriminating means for discriminating said performance data from other data on the basis of a frequency of data which is played back from said recording medium; and an delivering means for selectively delivering said performance data, which is discriminated by said discriminating means, to said performance device.

5. A performance recording and playback apparatus as defined in claim 3 wherein said performance apparatus is an automatic piano or an electronic musical instrument, while said recording device is a video tape recorder so that said recording medium is a video tape.

6. A performance recording and playback apparatus as defined in claim 3 wherein said predetermined transfer rate is determined on the basis of a MIDI standard.

7. A performance recording and playback apparatus comprising:
   temporary storing means for temporarily storing performance data which are sequentially supplied from a performance device played by a performer, said performance data containing time data representing a relative time interval between adjacent notes which are sequentially produced;
   synchronizing signal producing means for producing a synchronizing signal in accordance with said performance data, so that video data representing a performance scene is recorded on a recording medium by a recording device together with said synchronizing signal;
   correcting means for correcting said performance data read from said temporary storing means such that said time data of said performance data is corrected by use of a predetermined correction value, so that said correcting means outputs corrected performance data;
   performance data storing means for storing said corrected performance data therein; and
   reading control means for controlling a reading operation of said performance data storing means such that said video data and said synchronizing signal are played back from said recording medium in parallel, while said performance data is read from said performance data storing means in accordance with said synchronizing signal which is played back from said recording medium, so that said performance data is supplied to and reproduced by said performance device in synchronism with said video data which is played back and displayed on a display device.

8. A performance recording and playback apparatus as defined in claim 7 wherein said performance data storing means is a nonvolatile memory.

9. A performance recording and playback apparatus as defined in claim 7 wherein said correcting means only corrects one of said time data which corresponds to a first note to be emerged in a musical performance played by the performer by use of said performance apparatus.

10. A method for recording and playing back performance data for a system having a display apparatus and an automatic player piano, comprising the steps of:
   recording musical performance information on a common recording medium having plurality of channels together with visual information and audio information, said musical performance information, said audio information, and said visual information each being recorded on a separate respective channel of said recording medium;
   reading out information from the common recording medium;
   judging whether the information read out is the musical performance information;
   selecting an output destination from one of the display apparatus and the automatic player piano; and
   delivering the information to the output destination selected.

11. A method for recording and playing back performance data for a system having a display apparatus and an automatic player piano, comprising the steps of:
   recording musical performance information on a common recording medium having a plurality of channels together with visual information and audio information, said musical performance information, said audio information, and said visual information each being recorded on a separate respective channel of said recording medium;
   reading out information from the common recording medium;
   counting a number of cycles of predetermined signals to be included in the information read out so as to judge whether the information is the musical performance information;
   selecting an output destination from one of the display apparatus and the automatic player piano; and
   delivering the information to the output destination selected.

12. A method according to claim 11 wherein the musical performance information is MIDI information.

13. A musical performance data control system having a musical instrument which performs a music based on MIDI-format musical performance data, a visual information recorder which records visual information and audio information which is discriminative from said musical performance data and a display unit for displaying images based on said visual information, comprising:
   a single storing medium having a plurality of channels and associated with said visual information recorder for storing said visual information, said audio information and said musical performance data, said visual information, said audio information and said musical performance data each being recorded on a separate respective channel of said storing medium;
   a selector, to which said audio information and said musical performance information are inputted, for selectively outputting said audio information and said musical performance information; and
   a controller for discriminating characteristics of signals inputted to said selector so as to cause said selector to selectively output said musical performance information to said musical instrument and also output said audio information to said display unit based on a result of said discrimination.

14. A musical performance data control system according to claim 13 wherein said controller causes said selector to output said musical performance information to said musical instrument when said musical performance information is inputted to said selector.

15. A musical performance data control system according to claim 13 wherein said controller causes said selector to output said audio information to said display unit when said audio information is inputted to said selector.

16. A musical performance data control system according to claim 13 wherein said single storing medium is a video tape.

17. A musical performance data control system according to claim 13 wherein said controller is a central processing unit (CPU).

18. A musical performance data control system according to claim wherein said musical instrument is a player piano.

19. A musical performance data control system according to claim wherein said visual information recorder is a video cassette recorder.

20. A musical performance data control system according to claim 13 wherein said display unit is a cathode-ray tube (CRT).

21. A musical performance data control system according to claim 13 wherein said selector is a relay.

* * * * *